(12) United States Patent
Lee et al.

(10) Patent No.: US 11,745,761 B2
(45) Date of Patent: Sep. 5, 2023

(54) PATH PROVIDING DEVICE AND PATH PROVIDING METHOD THEREOF

(71) Applicant: LG Electronics Inc., Seoul (KR)

(72) Inventors: Jinsang Lee, Seoul (KR); Sujin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 344 days.

(21) Appl. No.: 17/035,227

(22) Filed: Sep. 28, 2020

(65) Prior Publication Data

US 2021/0039675 A1 Feb. 11, 2021

Related U.S. Application Data

(63) Continuation of application No. PCT/KR2019/009978, filed on Aug. 8, 2019.

(51) Int. Cl.
*B60W 60/00* (2020.01)
*G01C 21/00* (2006.01)
*G01C 21/34* (2006.01)

(52) U.S. Cl.
CPC ..... *B60W 60/0011* (2020.02); *G01C 21/3415* (2013.01); *G01C 21/3889* (2020.08); *B60W 2420/42* (2013.01); *B60W 2552/53* (2020.02)

(58) Field of Classification Search
None
See application file for complete search history.

(56) References Cited

U.S. PATENT DOCUMENTS

| | | | |
|---|---|---|---|
| 2007/0198184 A1* | 8/2007 | Yoshioka | G09B 29/106 701/426 |
| 2022/0003570 A1* | 1/2022 | Ukai | G08G 1/167 |
| 2022/0122457 A1* | 4/2022 | Patel | G01C 21/3635 |

FOREIGN PATENT DOCUMENTS

| | | |
|---|---|---|
| JP | 3987877 | 10/2007 |
| KR | 10-1998-0072359 | 11/1998 |
| KR | 10-2015-0089591 | 8/2015 |
| KR | 10-2015-0089593 | 8/2015 |
| KR | 10-2018-0000672 | 1/2018 |

* cited by examiner

*Primary Examiner* — Yuen Wong
*Assistant Examiner* — Hongye Liang
(74) *Attorney, Agent, or Firm* — Fish & Richardson P.C.

(57) ABSTRACT

A path providing device configured to provide a path information to a vehicle includes: a communication unit configured to receive map information from a server, the map information including a plurality of layers of data, an interface unit configured to receive sensing information from one or more sensors disposed at the vehicle, a memory configured to store information used to determine and update the optimal path, and divided into a plurality of storage spaces, and a processor configured determine an optimal path for guiding the vehicle from an identified lane, generate autonomous driving visibility information based on the sensing information and the determined optimal path, update the optimal path based on dynamic information related to a movable object located in the optimal path and the autonomous driving visibility information, and store the plurality of map information separately in the plurality of storage space.

18 Claims, 22 Drawing Sheets

[ V2X-LDM ]

[ eHorizon-ADASIS ]

PATH PROVIDING DEVICE AND PATH PROVIDING METHOD THEREOF

CROSS-REFERENCE TO RELATED APPLICATION

This application is a continuation of International Application No. PCT/KR2019/009978, filed on Aug. 8, 2019, the disclosure of which is incorporated by reference in its entirety.

TECHNICAL FIELD

The present disclosure relates to a path providing device disposed at a vehicle for providing a path (route) to the vehicle and a path providing method thereof.

BACKGROUND

A vehicle refers to means of transporting people or goods by using kinetic energy. Representative examples of vehicles include automobiles and motorcycles.

For safety and convenience of a user who uses the vehicle, various sensors and devices are provided in the vehicle, and functions of the vehicle are diversified.

The functions of the vehicle may be divided into a convenience function for promoting driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safeties of the driver and/or pedestrians, and may include various functions, such as a lane departure warning system (LDWS), a lane keeping assist system (LKAS), an autonomous emergency braking (AEB), and the like.

For the convenience of a user using a vehicle, various types of sensors and electronic devices are provided in the vehicle. Specifically, a study on an Advanced Driver Assistance System (ADAS) is actively undergoing. In addition, an autonomous vehicle is actively under development.

As the development of the advanced driver assistance system (ADAS) is actively undergoing in recent time, development of a technology for optimizing user's convenience and safety while driving a vehicle is required.

As part of this effort, in order to effectively transmit electronic Horizon (eHorizon) data to autonomous driving systems and infotainment systems, the European Union Original Equipment Manufacturing (EU OEM) Association has established a data specification and transmission method as a standard under the name "Advanced Driver Assistance Systems Interface Specification (ADASIS)."

In addition, eHorizon (software) is becoming an integral part of safety/ECO/convenience of autonomous vehicles in a connected environment.

SUMMARY

The present disclosure describes a path providing device and a path providing method thereof capable of providing horizon information for autonomous driving that enables autonomous driving.

The present disclosure also describes a path providing device and a path providing method thereof including a memory configured to store information for generating or updating horizon information for autonomous driving in an optimized manner.

According to one aspect of the subject matter described in this application a path providing device configured to provide a path information to a vehicle includes a communication unit configured to receive, from a server, map information including a plurality of layers of data, an interface unit configured to receive sensing information from one or more sensors disposed at the vehicle, the sensing information including an image received from an image sensor, and a processor. The processor may be configured to identify a lane in which the vehicle is located among a plurality of lanes of a road based on the sensing information, determine an optimal path for guiding the vehicle from the identified lane, the optimal path comprising one or more lanes included in the map information, generate autonomous driving visibility information and transmit the generated autonomous driving visibility information to at least one of the server or an electric component disposed at the vehicle based on the sensing information and the determined optimal path, and update the optimal path based on dynamic information related to a movable object located in the optimal path and the autonomous driving visibility information. The path providing device may further include a memory configured to store information used to determine and update the optimal path, and divided into a plurality of storage spaces and the processor may be configured to store, upon receiving a plurality of map information generated by different map information suppliers, the plurality of map information separately in the plurality of storage spaces.

Implementations according to this aspect may include one or more of the following features. For example, the processor may be further configured to store first map information received from a first map information supplier in a first storage space among the plurality of storage spaces, and store second map information received from a second map information supplier in a second storage space among the plurality of storage spaces.

In some examples, the processor may be further configured to determine a storage space to store the plurality of map information, based on a capacity of the received plurality of map information.

In some implementations, the processor may be further configured to divide a road to a destination into multiple path sections based on characteristics of the road, and determine a type of map information to be used for each of the divided path sections based on the characteristics of the road. In some examples, the processor is further configured to generate a first optimal path of a first path section having a first characteristic among the divided path sections by using first map information associated with the first characteristic, and generate a second optimal path of a second path section having a second characteristic among the divided path sections by using second map information associated with the second characteristic. In some examples, the second characteristic may be different from the first characteristic.

In some examples, the first map information and the second map information may be different map information received from different map information suppliers. In some examples, the first map information and the second map information may be partial map information each having a size that is equal to or smaller than a predetermined size and configured to include the divided path sections.

In some implementations, the processor may be further configured to determine a path section including current vehicle location among the divided path sections, determine map information in the memory based on characteristics of the road on the determined path section, and determine an optimal path in the determined path section for guiding the vehicle by using the determined map information.

In some implementations, the memory may include a first memory configured to temporarily store data, and a second memory configured to store data. In some examples, the plurality of map information may be stored in the second memory, and the processor may be further configured to divide a road to a destination into multiple path sections based on characteristics of the road, determine map information to be used for each of the divided path sections based on the characteristics of the road, and load the determined map information from the second memory to the first memory to generate optimal paths for each of the divided path sections.

In some examples, the processor may be further configured to delete, based on a vehicle passes through a path section in which map information loaded into the first memory being used, the loaded map information. In some examples, the processor may be further configured to store information received through the communication unit in the first memory, and based on a type of information stored in the first memory, delete the information from the first memory or move the information to the second memory for storage from the first memory.

In some implementations, the processor may be further configured to, based on information received through the communication unit being map information having a predetermined capacity or more, store the map information in an external storage provided in at least one of the vehicle or outside the path providing device. In some examples, the second memory may be configured to be divided into a plurality of storage spaces, and a plurality of layers of the map information may be separately stored in each of the plurality of storage spaces.

In some examples, the processor may be further configured to determine (i) a type of memory in which each of the plurality of layers is stored and (ii) a storage space in the second memory, based on a type or a capacity of each of the plurality of layers of the map information.

According to another aspect of the subject matter described in this application, a path providing method is provided. The method may include receiving, from a server, map information including a plurality of layers of data, receiving sensing information from one or more sensors disposed at a vehicle, the sensing information including an image received from an image sensor, identifying a lane in which the vehicle is located among a plurality of lanes of a road based on the sensing information, determining an optimal path for guiding the vehicle from the identified lane, the optimal path comprising one or more lanes included in the map information, generating autonomous driving visibility information and transmitting the generated autonomous driving visibility information to at least one of the server or an electric component disposed at the vehicle based on the sensing information and the determined optimal path, and updating the optimal path based on dynamic information related to a movable object located in the optimal path and the autonomous driving visibility information, and storing, in a memory, information used to determine and update the optimal path, the memory divided into a plurality of storage spaces, and storing, upon receiving a plurality of map information generated by different map information suppliers, the plurality of map information separately in the plurality of storage spaces.

Implementations according to this aspect may include one or more following features. For example, the method may further include storing first map information received from a first map information supplier in a first storage space among the plurality of storage spaces, and storing second map information received from a second map information supplier in a second storage space among the plurality of storage spaces.

In some implementations, the method may further include determining a storage space to store the plurality of map information, based on a capacity of the received plurality of map information. In some examples, the method may further include dividing a road to a destination into multiple path sections based on characteristics of the road, and determining a type of map information to be used for each of the divided path sections based on the characteristics of the road.

In some examples, the method may further include generating a first optimal path of a first path section having a first characteristic among the divided path sections by using first map information associated with the first characteristic, and generating a second optimal path of a second path section having a second characteristic among the divided path sections by using second map information associated with the second characteristic. In some implementations, the second characteristic may be different from the first characteristic.

DETAILED DESCRIPTION

Figure 1:
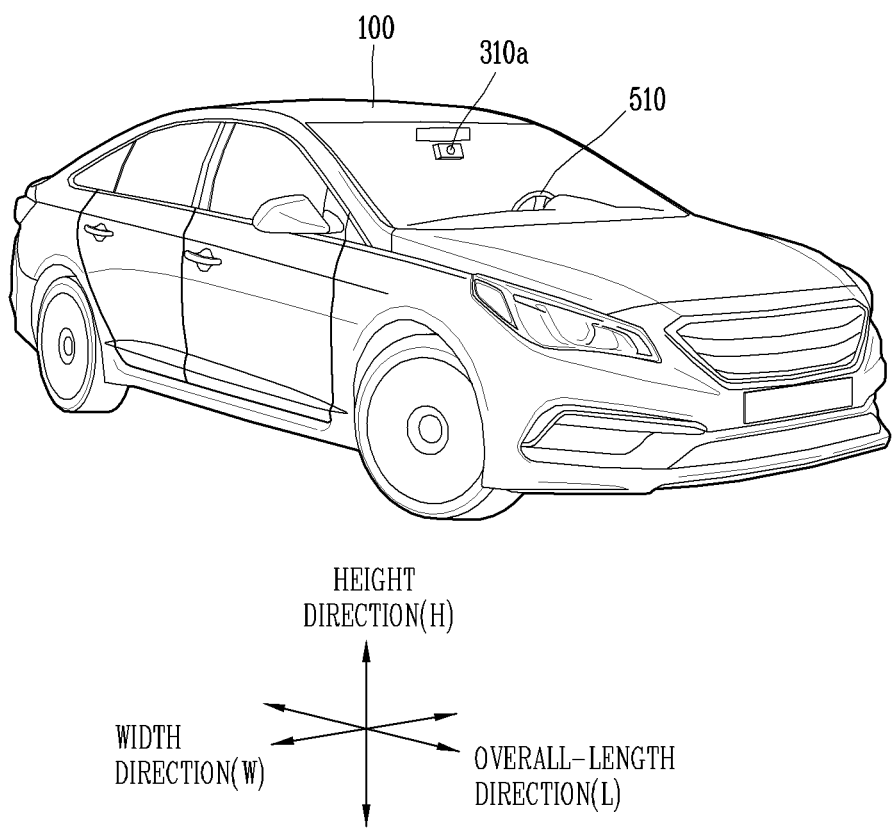
FIG. 1 illustrates an outer appearance of a vehicle.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to some implementations of the present disclosure may be understood as a conception including cars, motorcycles and the like. Hereinafter, the vehicle will be described based on a car.

The vehicle according to some implementations of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle or the like refers to a left side in a driving direction of the vehicle, and a right side of the vehicle or the like refers to a right side in the driving direction.

FIG. FIG. FIGS. FIGS. FIG. As illustrated in FIG. 1 to 7, a vehicle 100 may include wheels turning by a driving force, and a steering input device 510 for adjusting a driving (proceeding, moving) direction of the vehicle 100.

The vehicle 100 may be an autonomous vehicle.

In some implementations, the vehicle 100 may be switched into an autonomous mode or a manual mode based on a user input.

Figure 7:
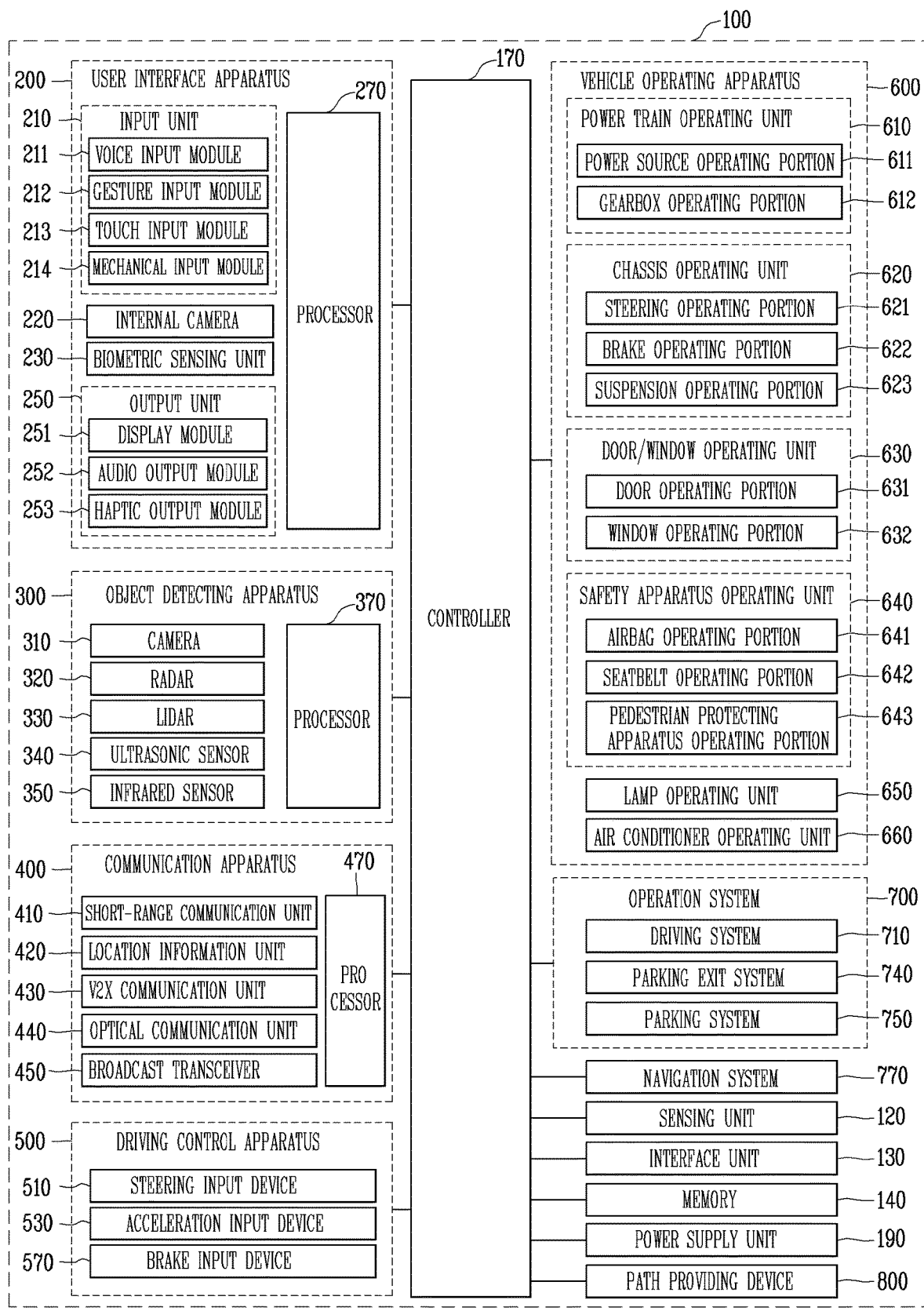
FIG. 7 is a block diagram of an exemplary vehicle.

For example, the vehicle 100 may be converted from the manual mode into the autonomous mode or from the autonomous mode into the manual mode based on a user input received through a user interface apparatus 200 in FIG. 7.

The vehicle 100 may be switched into the autonomous mode or the manual mode based on driving environment information. The driving environment information may be generated based on object information provided from an object detecting apparatus 300 in 7.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400 in FIG. 7.

The vehicle 100 may be switched from the manual mode into the autonomous mode or from the autonomous module into the manual mode based on information, data, or signal provided from an external device.

When the vehicle 100 is driven in the autonomous mode, the vehicle 100 may be driven based on an operation system 700.

For example, the autonomous vehicle 100 may be driven based on information, data or signal generated in a driving system 710, a parking exit system 740, and a parking system 750.

When the vehicle 100 is driven in the manual mode, the vehicle 100 may receive a user input for driving through a driving control apparatus 500. The vehicle 100 may be driven based on the user input received through the driving control apparatus 500.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170, a power supply unit 190, and a path providing device 800.

The vehicle 100 may include more components in addition to the components to be explained in this specification or may exclude one or more of the components described in this specification.

The user interface apparatus 200 is an apparatus that provides communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250, and at least one processor such as a processor 270.

The user interface apparatus 200 may include more components in addition to the components that are described in this specification or may exclude one or more of those components described in this specification.

The input unit 210 may allow the user to input information. Data collected in the input unit 210 may be analyzed by the processor 270 and processed as a user's control command.

The input unit 210 may be disposed inside the vehicle. For example, the input unit 210 may be disposed on or around a steering wheel, an instrument panel, a seat, each pillar, a door, a center console, a headlining, a sun visor, a wind shield, a window or other suitable areas in the vehicle.

The input unit 210 may include a voice input module 211, a gesture input module 212, a touch input module 213, and a mechanical input module 214.

The voice input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal.

The converted electric signal may be provided to the processor 270 or the controller 170.

The gesture input module 212 may include at least one of an infrared sensor or an image sensor for detecting the user's gesture input.

According to some implementations, the gesture input module 212 may detect a user's three-dimensional (3D) gesture input. For example, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an implementation, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door, and/or other suitable areas in the vehicle.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing unit 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252, or a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display, and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display, and a transparent LED display. The transparent display may have adjustable transparency.

Meanwhile, the user interface apparatus 200 may include a plurality of display modules 251a to 251g as depicted in 3, 4, and 6.

Figure 3:
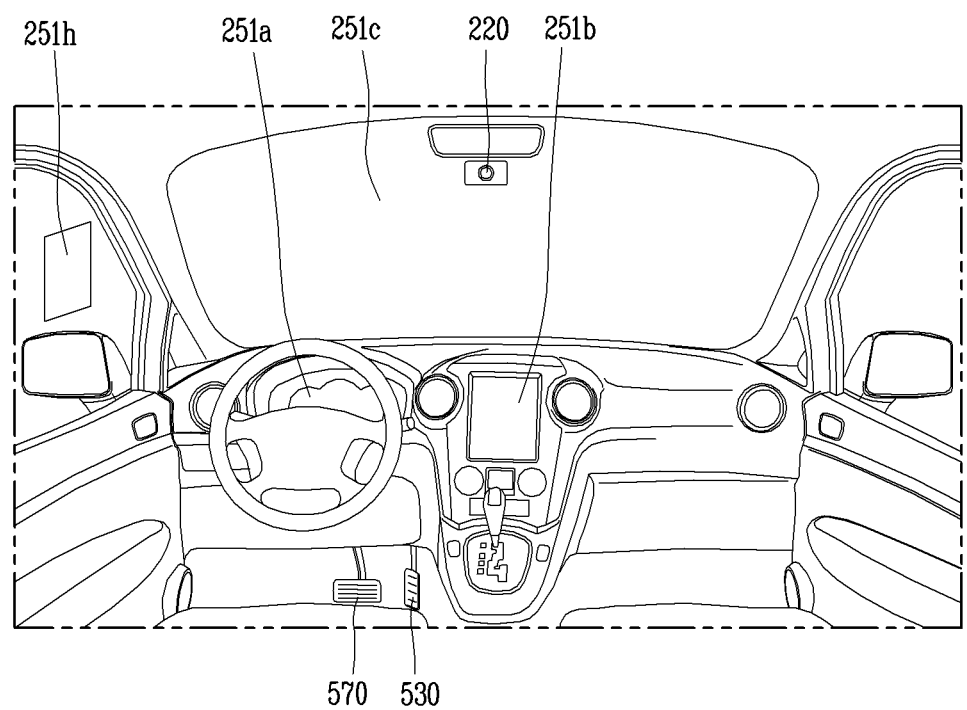
FIGS. 3 and 4 illustrate a vehicle interior.
Figure 4:
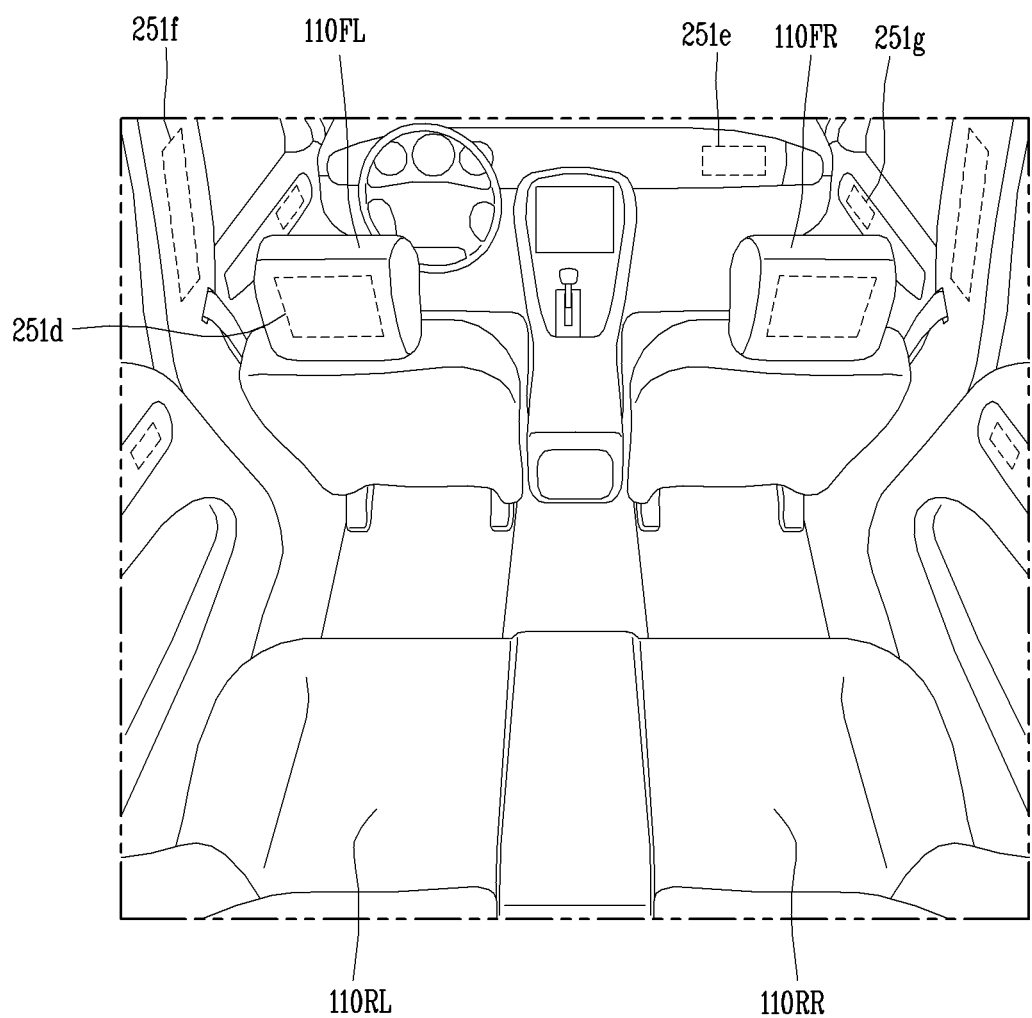

The display module 251 may be disposed on or around a steering wheel, instrument panels 251a, 251b, and 251e, (as depicted in 3, 4, and 6), a seat 251d (as depicted in FIG. 4), each pillar 251f (as depicted in FIG. 4), a door 251g (as depicted in FIG. 4), a center console, a headlining or a sun visor, or implemented on or around a windshield 251c and/or a window 251h (as depicted in FIG. 3).

The audio output module 252 may convert an electric signal provided from the processor 270 or the controller 170 into an audio signal for output. For example, the audio output module 252 may include at least one speaker.

The haptic output module 253 may generate a tactile output. For example, the haptic output module 253 may vibrate the steering wheel, a safety belt, a seat 110FL, 110FR, 110RL, 110RR (in FIG. 4) such that the user can recognize such output.

The processor 270 may control an overall operation of each unit of the user interface apparatus 200.

In some implementations, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

The user interface apparatus 200 may also be referred to herein as a display apparatus for vehicle.

In some implementations, the user interface apparatus 200 may operate according to the control of the controller 170.

Referring still to FIG. 7, the object detecting apparatus 300 is an apparatus for detecting an object located at outside of the vehicle 100.

The object may be a variety of objects associated with driving or operation of the vehicle 100.

Figure 5:
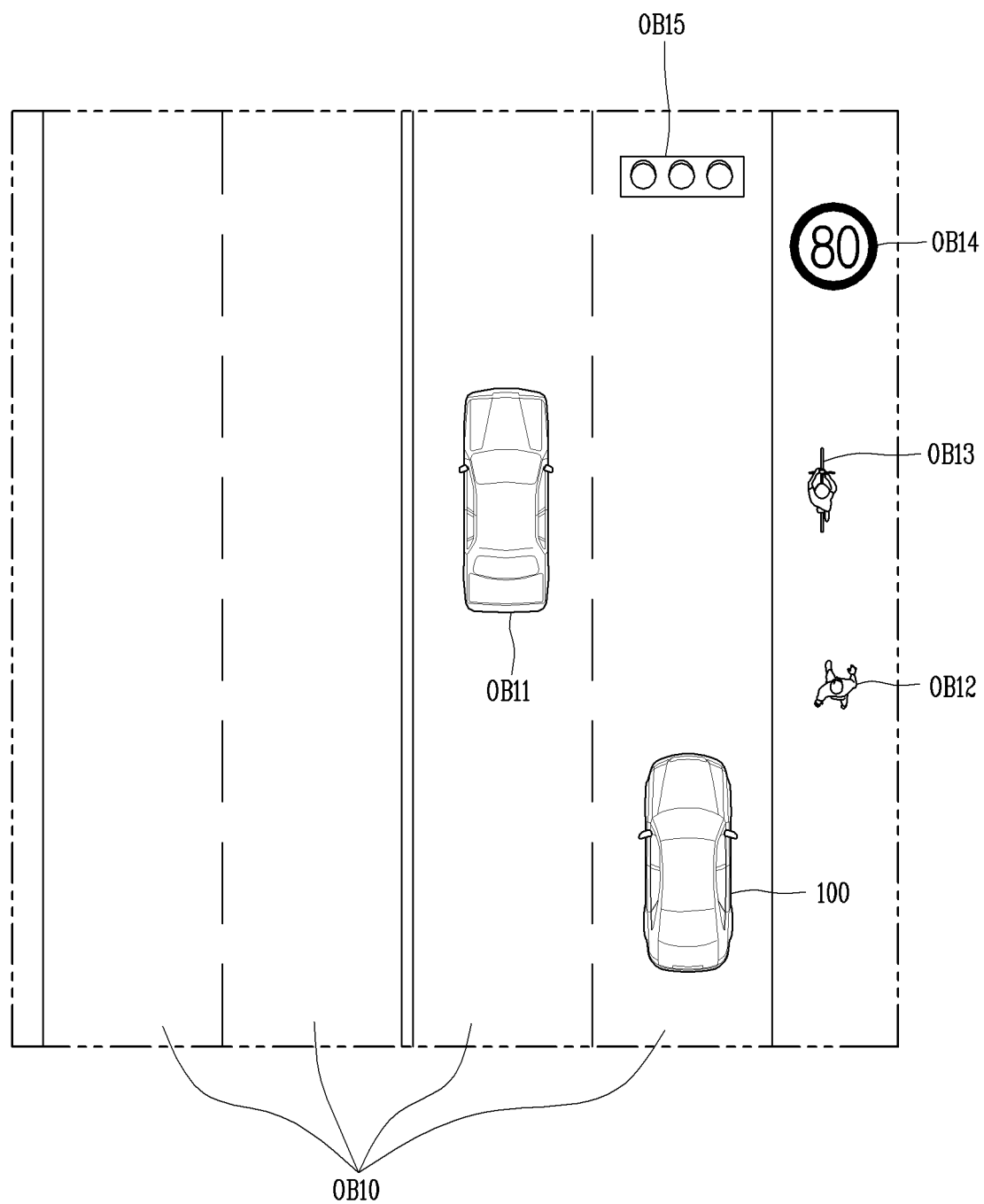
FIGS. 5 and 6 are diagrams referenced to describe objects.
Figure 6:
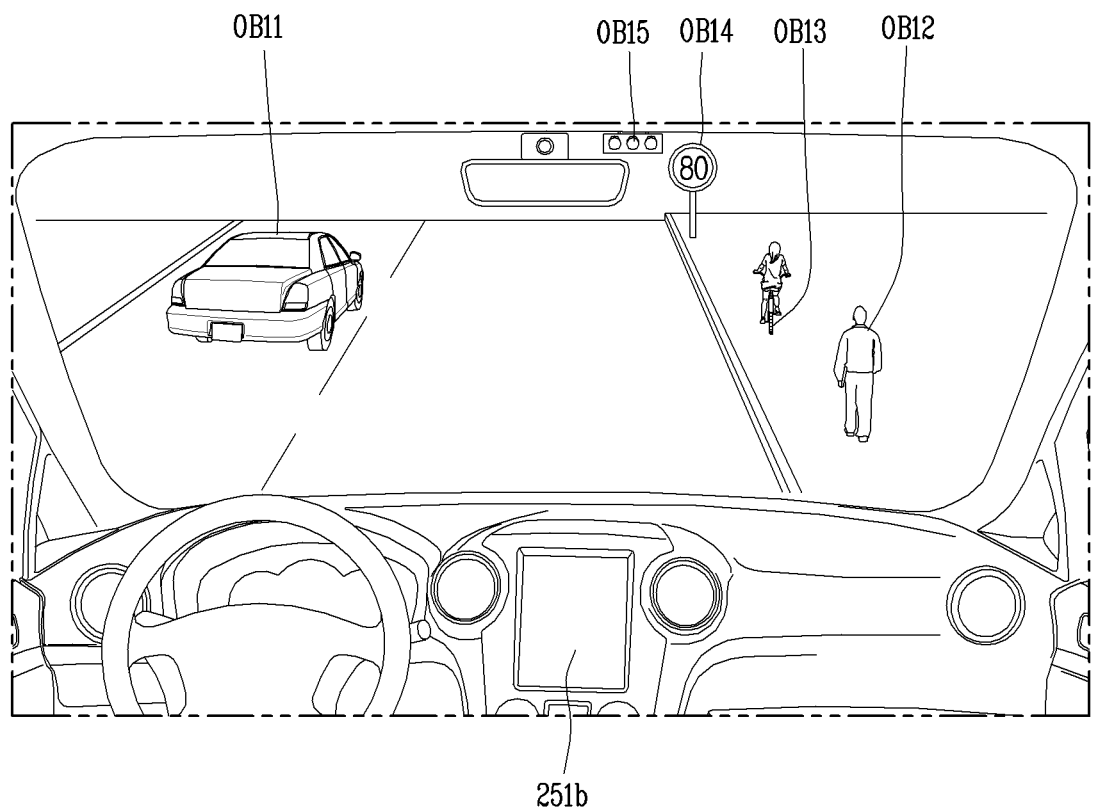

Referring to FIGS. 5 and 6, an object O may include traffic lanes OB10, another vehicle OB11, a pedestrian OB12, a two-wheeled vehicle OB13, traffic signals OB14 and OB15, light, a road, a structure, a speed hump, a terrain, an animal, and other objects.

The lane OB10 may be a driving lane, a lane next to the driving lane, or a lane on which another vehicle comes in an opposite direction to the vehicle 100. Each lane OB10 may include left and right lines forming the lane.

The another vehicle OB11 may be a vehicle which is moving near the vehicle 100. The another vehicle OB11 may be a vehicle located within a predetermined distance from the vehicle 100. For example, the another vehicle OB11 may be a vehicle moving ahead of or behind the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

In some implementations, objects may be classified into a moving object and a fixed object. For example, the moving object may include another vehicle or a pedestrian. The fixed object may include, for example, a traffic signal, a road, or a structure.

7, the object detecting apparatus 300 may include a camera 310, a radar 320, a LiDAR 330, an ultrasonic sensor 340, an infrared sensor 350, and at least one processor such as a processor 370.

In some implementations, the object detecting apparatus 300 may further include other components in addition to the components described herein, or may exclude one or more of the components described herein.

The camera 310 may be located on an appropriate portion outside the vehicle to acquire an external image of the vehicle. The camera 310 may be a mono camera, a stereo camera 310a (as depicted in 1 and 2), an around view monitoring (AVM) camera 310b (as depicted in 2) or a 360-degree camera.

In some implementations, the camera 310 may be disposed adjacent to a front windshield within the vehicle to acquire a front image of the vehicle. Alternatively or in addition, the camera 310 may be disposed adjacent to a front bumper or a radiator grill.

Alternatively or in addition, the camera 310 may be disposed adjacent to a rear glass within the vehicle to acquire a rear image of the vehicle. Alternatively or in addition, the camera 310 may be disposed adjacent to a rear bumper, a trunk or a tail gate.

Alternatively or in addition, the camera 310 may be disposed adjacent to at least one of side windows within the vehicle to acquire a side image of the vehicle. Alternatively or in addition, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

Figure 2:
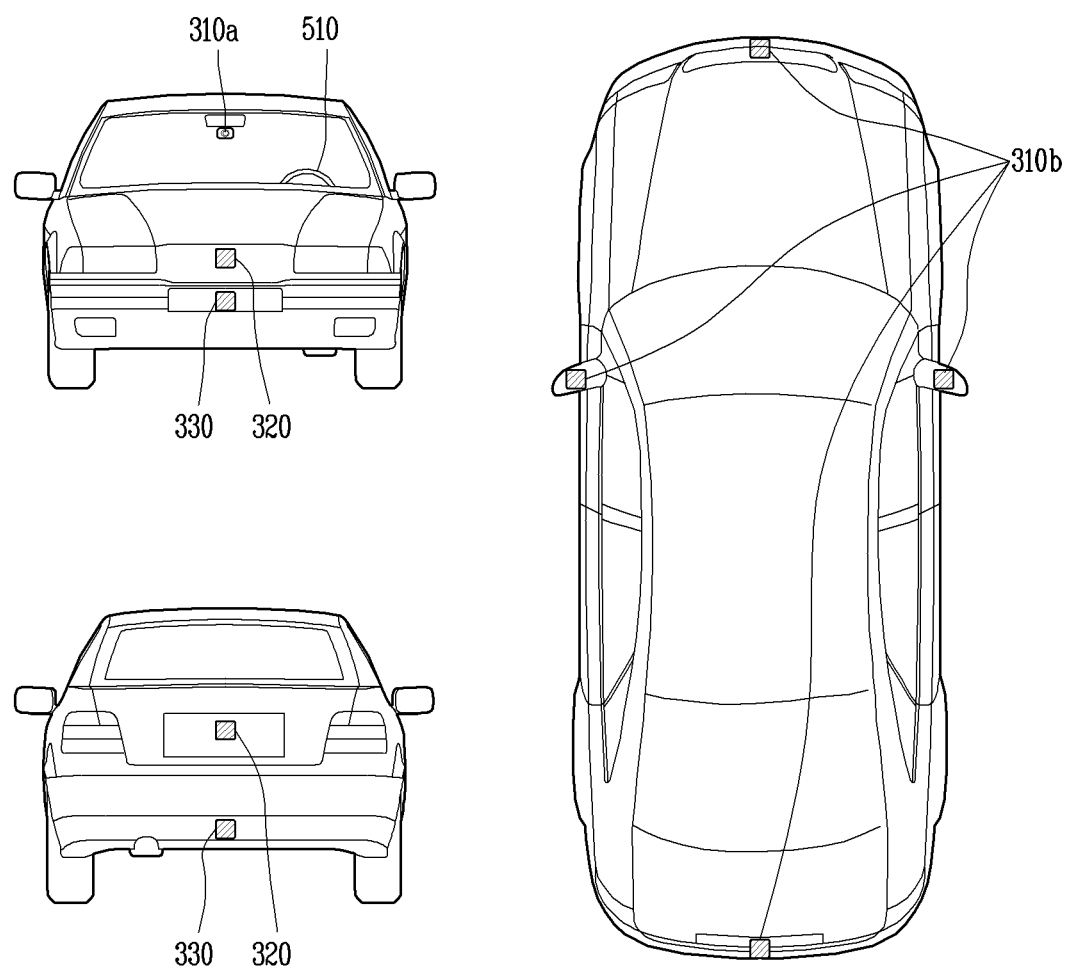
FIG. 2 illustrates a vehicle exterior from various angles.

The radar 320 may be disposed on an appropriate position outside the vehicle for detecting an object which is located at a front, rear or side of the vehicle as depicted in FIG. 2.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a time of flight (TOP) manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle as depicted in FIG. 2.

The ultrasonic sensor 340 may include ultrasonic wave transmitting and receiving portions. The ultrasonic sensor 340 may detect an object based on an ultrasonic wave, and detect a position of the detected object, a distance from the detected object, and a relative speed with the detected object.

The ultrasonic sensor 340 may be disposed on an appropriate position outside the vehicle for detecting an object located at the front, rear, or side of the vehicle.

The infrared sensor 350 may include infrared light transmitting and receiving portions. The infrared sensor 350 may detect an object based on infrared light, and detect a position of the detected object, a distance from the detected object, and a relative speed with the detected object.

The infrared sensor 350 may be disposed on an appropriate position outside the vehicle for detecting an object located at the front, rear, or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave, which is generated when an emitted electromagnetic wave is reflected from the object, and track the object. The processor 370 may execute operations, such as a calculation of a distance from the object, a calculation of a relative speed with the object, and the like, based on the reflected electromagnetic wave.

The processor 370 may detect an object based on a reflected laser beam, which is generated when an emitted laser beam is reflected from the object, and track the object.

The processor 370 may execute operations, such as a calculation of a distance from the object, a calculation of a relative speed with the object, and the like, based on the reflected laser beam.

The processor 370 may detect an object based on a reflected ultrasonic wave, which is generated when an emitted ultrasonic wave is reflected from the object, and track the object. The processor 370 may execute operations, such as a calculation of a distance from the object, a calculation of a relative speed with the object, and the like, based on the reflected ultrasonic wave.

The processor may detect an object based on reflected infrared light, which is generated when emitted infrared light is reflected from the object, and track the object. The processor 370 may execute operations, such as a calculation of a distance from the object, a calculation of a relative speed with the object, and the like, based on the reflected infrared light.

According to some implementations, the object detecting apparatus 300 may include a plurality of processors 370 or does not include the processor 370. In some implementations, each of the camera 310, the radar 320, the LiDAR 330, the ultrasonic sensor 340, and the infrared sensor 350 may include a processor, respectively.

When the processor 370 is not included in the object detecting apparatus 300, the object detecting apparatus 300 may operate according to the control of a processor of an apparatus within the vehicle 100 or the controller 170.

7, the object detecting apparatus 300 may operate according to the control of the controller 170.

The communication apparatus 400 is an apparatus for communicating with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to some implementations, the communication apparatus 400 may further include other components in addition to the components described herein, or may exclude one or more of the components described herein.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for communicating with an external device through the medium of light. The optical communication unit 440 may include a light-emitting diode for converting an electric signal into an optical signal and sending the optical signal to the exterior, and a photodiode for converting the received optical signal into an electric signal.

According to some implementations, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal, and a data broadcast signal.

The processor 470 may control an overall operation of each unit of the communication apparatus 400.

According to some implementations, the communication apparatus 400 may include a plurality of processors 470 or does not include the processor 470.

When the processor 470 is not included in the communication apparatus 400, the communication apparatus 400 may operate according to the control of a processor of another device within the vehicle 100 or the controller 170.

In some implementations, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

In some implementations, the communication apparatus 400 may operate according to the control of the controller 170.

Referring still to FIG. 7, the driving control apparatus 500 is an apparatus for receiving a user input for driving.

Ina manual mode, the vehicle 100 may be operated based on a signal provided by the driving control apparatus 500.

The driving control apparatus 500 may include a steering input device 510, an acceleration input device 530, and a brake input device 570.

The steering input device 510 may receive an input regarding a driving (proceeding) direction of the vehicle 100 from the user. The steering input device 510 may refer to a wheel allowing a steering input in a rotating manner. According to some implementations, the steering input device 510 may also refer to a touch screen, a touch pad, or a button.

The acceleration input device 530 may receive an input for accelerating the vehicle 100 from the user. The brake input device 570 may receive an input for braking the vehicle 100 from the user. Each of the acceleration input device 530 and the brake input device 570 may refer to a pedal. According to some implementations, the acceleration input device 530 or the brake input device 570 may also refer to a touch screen, a touch pad, or a button.

In some implementations, the driving control apparatus 500 may operate according to the control of the controller 170.

Referring still to FIG. 7, the vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described, or may not include some of the components described.

In some implementations, the vehicle operating apparatus 600 may include a processor. Alternatively or in addition, each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

In other example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N), or parking (P).

For example, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622, and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In some implementations, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some implementations, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

Referring still to FIG. 7, the safety apparatus operating unit 640 may perform an electronic control for various safety apparatuses within the vehicle 100.

The safety apparatus operating unit 640 may include an airbag operating portion 641, a seatbelt operating portion 642, and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, and 110RR (depicted in FIG. 4) using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

Referring still to FIG. 7, the lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when an internal temperature of the vehicle is high.

In some implementations, the vehicle operating apparatus 600 may include a processor.

Each unit of the vehicle operating apparatus 600 may individually include a processor.

In some implementations, the vehicle operating apparatus 600 may operate according to the control of the controller 170.

Referring still to FIG. 7, the operation system 700 is a system that controls various driving modes of the vehicle 100. The operation system 700 may operate in an autonomous driving mode.

The operation system 700 may include a driving system 710, a parking exit system 740, and a parking system 750.

According to implementations, the operation system 700 may further include other components in addition to the components described herein, or may exclude one or more of the components described herein.

In some implementations, the operation system 700 may include at least one processor. Alternatively, or in addition, each unit of the operation system 700 may individually include at least one processor.

According to some implementations, the operation system 700 may be implemented by the controller 170 when it is implemented in a software configuration.

In some implementations, the operation system 700 may include at least one of the user interface apparatus 200, the object detecting apparatus 300, the communication apparatus 400, the vehicle operating apparatus 600, or the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600, and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770 and transmit a control signal to the vehicle operating apparatus 600 to park the vehicle 100.

The parking system 750 may receive object information from the object detecting apparatus 300, and transmit a control signal to the vehicle operating apparatus 600 to park the vehicle 100.

The parking system 750 may receive a signal from an external device through the communication apparatus 400, and transmit a control signal to the vehicle operating apparatus 600 to park the vehicle 100.

The navigation system 770 may provide navigation information. The navigation information may include at least one of map information, information regarding a set destination, path information according to the set destination, information regarding various objects on a path, lane information, and current location information of the vehicle 100.

The navigation system 770 may include a memory and a processor. The memory may store the navigation information. The processor may control an operation of the navigation system 770.

According to some implementations, the navigation system 770 may update stored information by receiving information from an external device through the communication apparatus 400.

According to some implementations, the navigation system 770 may be classified as a sub component of the user interface apparatus 200.

The sensing unit 120 may detect a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal, and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some implementations, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to some implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

In some implementations, the vehicle 100 according to the present disclosure may include a path providing device 800.

The path providing device 800 may control at least one of those components illustrated in FIG. 7. From this perspective, the path providing device 800 may be the controller 170.

Without a limit to this, the path providing device 800 may be a separate device, independent of the controller 170. When the path providing device 800 is implemented as a component independent of the controller 170, the path providing device 800 may be provided on apart of the vehicle 100.

Hereinafter, description will be given of implementations in which the path providing device 800 is a component which is separate from the controller 170, for the sake of explanation. As such, according to implementations described in this disclosure, the functions (operations) and control techniques described in relation to the path providing device 800 may be executed by the controller 170 of the vehicle. That is, every detail described in relation to the path providing device 800 may be applied to the controller 170 in the same/similar manner.

Also, the path providing device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of a method of autonomously driving a vehicle related to the present disclosure in an optimized manner or providing path information optimized for the travel the vehicle, with reference to the accompanying drawings.

Figure 8:
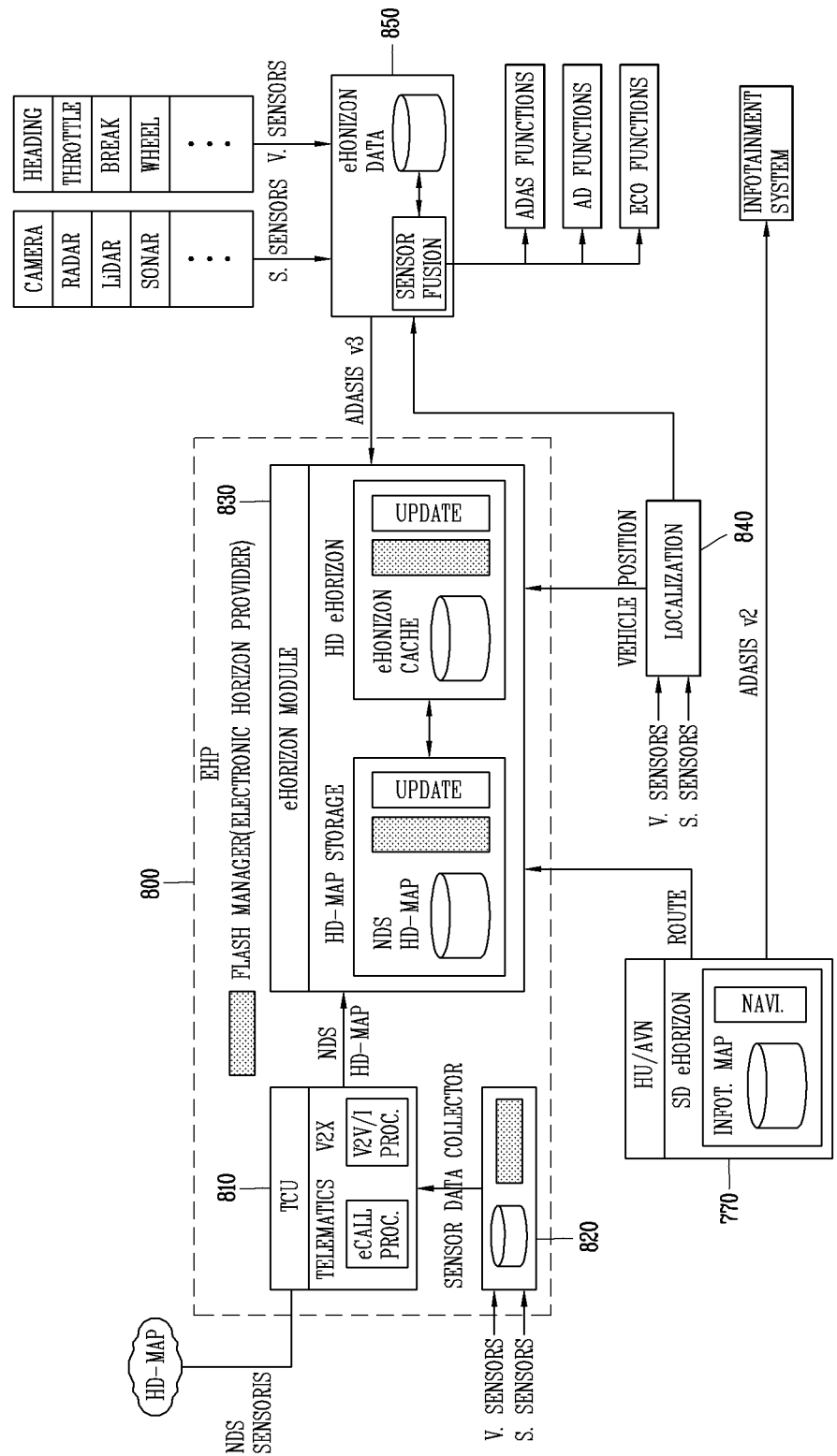
FIG. 8 is a diagram of an exemplary Electronic Horizon Provider (EHP).

FIG. 8 is a diagram of an exemplary Electronic Horizon Provider (EHP).

Referring to FIG. 8, a path providing device 800 may autonomously control the vehicle 100 based on eHorizon (electronic Horizon).

The path providing device 800 may be an electronic horizon provider (EHP).

In some implementations, Electronic Horizon may be refer to 'ADAS Horizon', 'ADASIS Horizon', 'Extended Driver Horizon' or 'eHorizon'.

The eHorizon may be a software, a module, or a system that performs operations including generating vehicle's forward path information (e.g., using high-definition (HD) map data), configuring the vehicle's forward path information based on a specified standard (protocol) (e.g., a standard specification defined by the ADAS), and transmitting the configured vehicle forward path information to an application (e.g., an ADAS application, a map application, etc.) which may be installed in a module (e.g., an ECU, the controller 170, the navigation system 770, etc.) of the vehicle or in the vehicle requiring map information (or path information).

In some implementations, the vehicle's forward path (or a path to the destination) may be provided as a single path based on a navigation map. In some implementations, eHorizon may provide lane-based path information based on a high-definition (HD) map.

Data generated by eHorizon may refer to 'electronic horizon data' or 'eHorizon data'. The electronic horizon data may be driving plan data which is used to generate a driving control signal of the vehicle 100 in a driving (traveling) system. For example, the electronic horizon data may be driving plan data which provides a range from a point where the vehicle 100 is located to horizon.

The horizon may be a point in front of a location of the vehicle 100, by a preset distance, on the basis of a preset travel path. The horizon may refer to a point where the vehicle 100 is to reach after a predetermined time from the point, at which the vehicle 100 is currently located, along a preset travel path. Here, the travel path refers to a path for the vehicle to travel up to a final destination, and may be set by a user input.

Electronic horizon data may include horizon map data and horizon path data. The horizon map data may include at least one of topology data, ADAS data, HD map data, or dynamic data. According to some implementations, the horizon map data may include a plurality of layers of data. For example, the horizon map data may include a first layer that matches topology data, a second layer that matches ADAS data, a third layer that matches HD map data, and a fourth layer that matches dynamic data. The horizon map data may further include static object data.

Topology data may be a map created by connecting road centers. Topology data may indicate a position of a vehicle and may be in the form of data used in a navigation for a driver. For example, topology data may be road information excluding lane-related information. Topology data may be generated based on data received by an infrastructure through V2I. For example, topology data may be based on data generated in the infrastructure. By way of further example, topology data may be based on data stored in at least one memory included in the vehicle 100.

ADAS data may refer to data related to road information. ADAS data may include at least one of road slope data, road curvature data, or road speed limit data. ADAS data may further include no-passing zone data. ADAS data may be based on data generated in an infrastructure. In some implementations, ADAS data may be based on data generated by the object detecting apparatus 300. ADAS data may be named road information data.

HD map data may include detailed lane-unit topology information of a road, connection information of each lane, and feature information for localization of a vehicle (e.g., traffic signs, lane marking/attributes, road furniture, etc.). HD map data may be based on data generated in an infrastructure.

Dynamic data may include various dynamic information that may be generated on a road. For example, the dynamic data may include construction information, variable-speed lane information, road surface state information, traffic information, moving object information, and any other information associated with the road. Dynamic data may be based on data received by an infrastructure. In some implementations, dynamic data may be based on data generated by the object detecting apparatus 300.

The path providing device 800 may provide map data within a range from a location of the vehicle 100 to the horizon. The horizon path data may be a trajectory that the vehicle 100 can take within the range from the location of the vehicle 100 to the horizon. The horizon path data may include data indicating a relative probability to select one road at a decision point (e.g., fork, intersection, crossroads, etc.). Relative probability may be calculated based on a time taken to arrive at a final destination. For example, if a shorter time is taken to arrive at the final destination by selecting a first road than selecting a second road at a decision point, the probability to select the first road may be calculated higher than the probability to select the second road.

The horizon path data may further include a main path and a sub path. The main path may be a trajectory connecting roads with a higher relative probability to be selected. The sub path may be merged with or diverged from at least one point on the main path. The sub path may be a trajectory connecting at least one road having a low relative probability to be selected at the at least one decision point on the main path.

eHorizon may be classified into categories such as software, a system, and the like. eHorizon denotes a configuration of aggregating real-time events, such as road shape information of a high-definition map, real-time traffic signs, road surface conditions, accidents and the like, under a connected environment of an external server (cloud server), V2X (Vehicle to everything) or the like, and providing the information related to the aggregated real-time events to the autonomous driving system and the infotainment system.

In some implementations, eHorizon may transfer a road shape on a high-definition map and real-time events with respect to the front of the vehicle to the autonomous driving system and the infotainment system under an external server/V2X environment.

In order to effectively transfer eHorizon data (information) transmitted from eHorizon (i.e., external server) to the autonomous driving system and the infotainment system, a data specification and transmission method may be formed in accordance with a technical standard called "Advanced Driver Assistance Systems Interface Specification (ADASIS)."

The vehicle 100 may use information, which is received (generated) in eHorizon, in an autonomous driving system and/or an infotainment system. For example, the autonomous driving system may use information provided by eHorizon in safety and ECO aspects.

In terms of the safety aspect, the vehicle 100 may perform an Advanced Driver Assistance System (ADAS) function such as Lane Keeping Assist (LKA), Traffic Jam Assist (TJA) or the like, and/or an AD (AutoDrive) function such as passing, road joining, lane change or the like, by using road shape information and event information received from eHorizon and surrounding object information sensed through the localization unit 840 provided in the vehicle.

Furthermore, in terms of the ECO aspect, the path providing device 800 may receive slope information, traffic light information, and the like related to a forward road from eHorizon, to control the vehicle so as to get efficient engine output, thereby enhancing fuel efficiency.

The infotainment system may include convenience aspect. For example, the vehicle 100 may receive from eHorizon accident information, road surface condition information, and the like related to a road ahead of the vehicle, and output the received information on a display unit (e.g., Head Up Display (HUD), CID, Cluster, etc.) provided in the vehicle, so as to provide guide information for the driver to drive the vehicle safely.

eHorizon may receive position information related to various types of event information (e.g., road surface condition information, construction information, accident information, etc.) occurred on roads and/or road-based speed limit information from the vehicle 100 or other vehicles or may collect such information from infrastructures (e.g., measuring devices, sensing devices, cameras, etc.) installed on the roads.

In addition, the event information and the road-based speed limit information may be linked to map information or may be updated.

In addition, the position information related to the event information may be divided into lane units.

By using such information, the eHorizon system (EHP) can provide information necessary for the autonomous driving system and the infotainment system to each vehicle, based on a high-definition map on which road conditions (or road information) can be determined on the lane basis. For example, an Electronic Horizon (eHorizon) Provider (EHP) may provide an high-definition map using coordinates of road-related information (for example, event information, position information regarding the vehicle 100, etc.) based on a high-definition map.

The road-related information provided by the eHorizon may be information included in a predetermined area (predetermined space) with respect to the vehicle 100.

The EHP may be a component which is included in an eHorizon system and configured to perform functions provided by the eHorizon (or eHorizon system).

The path providing device 800 may be EHP, as shown in FIG. 8.

The path providing device 800 (EHP) may receive a high-definition map from an external server (or a cloud server), generate path (route) information to a destination with respect to one or more lanes of a road, and transmit the high-definition map and the path information generated with respect to the one or more lanes to a module or application (or program) of the vehicle requiring the map information and the path information.

Referring to FIG. 8, FIG. 8 illustrates an exemplary overall structure of an Electronic Horizon (eHorizon) system.

The path providing device 800 (EHP) may include a telecommunication control unit (TCU) 810 that receives a high-definition map (HD-map) from a cloud server.

The TCU 810 may be the communication apparatus 400 described above, and may include at least one of components included in the communication apparatus 400.

The TCU 810 may include a telematics module or a vehicle to everything (V2X) module.

The TCU 810 may receive an HD map that complies with the Navigation Data Standard (NDS) (or conforms to the NDS standard) from the cloud server.

In addition, the HD map may be updated by reflecting data sensed by sensors provided in the vehicle and/or sensors installed around road, according to the sensor ingestion interface specification (SENSORIS).

The TCU 810 may download the HD map from the cloud server through the telematics module or the V2X module.

In addition, the path providing device 800 may include an interface unit 820. In some implementations, the interface unit 820 may receive sensing information from one or more sensors provided in the vehicle 100.

The interface unit 820 may refer to a sensor data collector. The interface unit 820 may collect or receive information sensed by sensors (V.Sensors) provided in the vehicle for detecting a manipulation of the vehicle (e.g., heading, throttle, break, wheel, etc.) and sensors (S.Sensors) for detecting surrounding information of the vehicle (e.g., Camera, Radar, LiDAR, Sonar, etc.) The interface unit 820 may transmit the information sensed through the sensors provided in the vehicle to the TCU 810 (or processor 830) to reflect the information in the HD map.

TCU 810 may update the HD map stored in the cloud server by transmitting the information transmitted from the interface unit 820 to the cloud server.

The path providing device 800 may include a processor 830 (or an eHorizon module).

The processor 830 may control the TCU 810 and the interface unit 820.

The processor 830 may store the HD map received through the TCU 810, and update the HD map using the information received through the interface unit 820. This operation may be performed in a storage part of the processor 830.

The processor 830 may receive first path information from an audio video navigation (AVN) or a navigation system 770.

The first path information may be route information provided in conventional systems and may be information for guiding a traveling path (travel path, driving path, driving route) to a destination. For example, the first path information provided by the conventional systems provides only one path information and does not distinguish lanes. In contrast, when the processor 830 receives the first path information, the processor 830 may generate second path information for guiding, with respect to one or more lanes of a road, a traveling path up to the destination set in the first path information, by using the HD map and the first path information. For example, the operation may be performed by a calculating part of the processor 830.

In addition, the eHorizon system may include a localization unit 840 for identifying the position of the vehicle by using information sensed through the sensors (V.Sensors, S.Sensors) provided in the vehicle.

The localization unit 840 may transmit the position information of the vehicle to the processor 830 to match the position of the vehicle identified by using the sensors provided in the vehicle with the HD map.

The processor 830 may match the position of the vehicle 100 with the HD map based on the position information of the vehicle.

The processor 830 may generate horizon data, electronic horizon data, and horizon path data.

The processor 830 may generate the electronic horizon data by reflecting the traveling (driving) situation of the vehicle 100. For example, the processor 830 may generate the electronic horizon data based on traveling direction data and traveling speed data of the vehicle 100.

The processor 830 may merge the generated electronic horizon data with previously-generated electronic horizon data. For example, the processor 830 may connect horizon map data generated at a first time point with horizon map data generated at a second time point on the position basis. For example, the processor 830 may connect horizon path data generated at a first time point with horizon path data generated at a second time point on the position basis.

The processor 830 may include a memory, an HD map processing part, a dynamic data processing part, a matching part, and a path generating part.

The HD map processing part may receive HD map data from a server through the TCU. The HD map processing part may store the HD map data. According to some implementations, the HD map processing part may also process the HD map data. The dynamic data processing part may receive dynamic data from the object detecting device. The dynamic data processing part may receive the dynamic data from a server. The dynamic data processing part may store the dynamic data. In some implementations, the dynamic data processing part may process the dynamic data.

The matching part may receive an HD map from the HD map processing part. The matching part may receive dynamic data from the dynamic data processing part. The matching part may generate horizon map data by matching the HD map data with the dynamic data.

According to some implementations, the matching part may receive topology data. The matching part may receive ADAS data. The matching part may generate horizon map data by matching the topology data, the ADAS data, the HD map data, and the dynamic data. The path generating part may generate horizon path data. The path generating part may include a main path generator and a sub path generator. The main path generator may generate main path data. The sub path generator may generate sub path data.

In addition, the eHorizon system may include a fusion unit 850 for fusing information (data) sensed through the sensors provided in the vehicle and eHorizon data generated by the eHorizon module (control unit). For example, the fusion unit 850 may update an HD map by fusing sensing data sensed by the vehicle with an HD map corresponding to eHorizon data, and provide the updated HD map to an ADAS function, an AD (AutoDrive) function, or an ECO function.

In addition, the fusion unit 850 may provide the updated HD map to the infotainment system.

FIG. 8 illustrates that the path providing device 800 merely includes the TCU 810, the interface unit 820, and the processor 830, but the present disclosure is not limited thereto.

The path providing device 800 of the present disclosure may further include at least one of the localization unit 840 or the fusion unit 850.

In addition or alternatively, the path providing device 800 (EHP) may further include a navigation system 770.

With such a configuration, when at least one of the localization unit 840, the fusion unit 850, or the navigation system 770 is included in the path providing device 800 (EHP), the functions/operations/controls performed by the included configuration may be understood as being performed by the processor 830.

Figure 9:
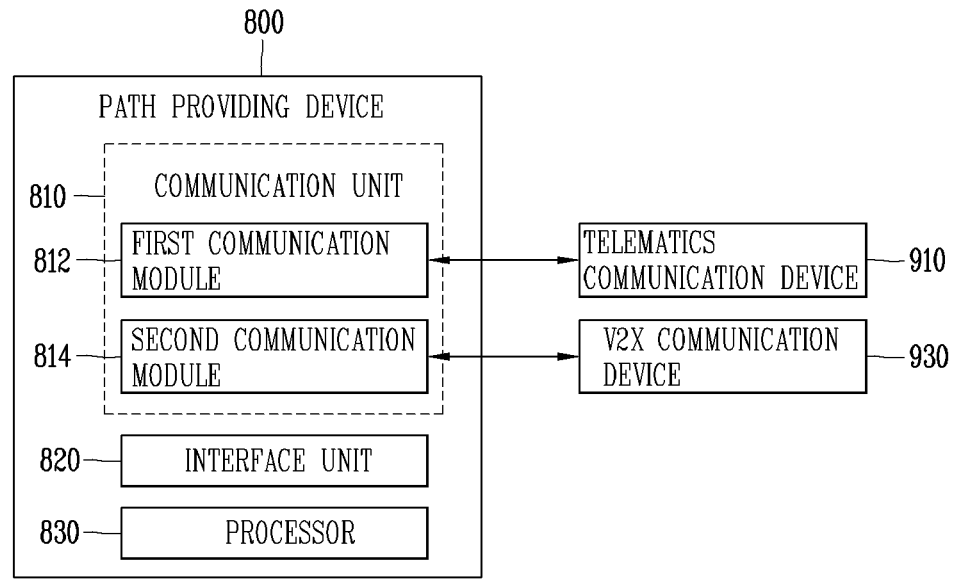
FIG. 9 is a block diagram of an exemplary path providing device of FIG. 8.

FIG. 9 is a block diagram of an exemplary path providing device (e.g., the path providing device of FIG. 8).

The path providing device refers to a device for providing a route (or path) to a vehicle. For example, the path providing device may be a device mounted on a vehicle to perform communication through CAN communication and generate messages for controlling the vehicle and/or electric components mounted on the vehicle. By way of further example, the path providing device may be located outside the vehicle, like a server or a communication device, and may perform communication with the vehicle through a mobile communication network. In this case, the path providing device may remotely control the vehicle and/or the electric components mounted on the vehicle using the mobile communication network.

The path providing device 800 is provided in the vehicle, and may be implemented as an independent device detachable from the vehicle or may be integrally installed on the vehicle to construct apart of the vehicle 100.

Referring to FIG. 9, the path providing device 800 may include a TCU 810, an interface unit 820, and a processor 830.

The TCU 810 may be configured to perform communications with various components provided in the vehicle. For example, the TCU 810 may receive various information provided through a controller area network (CAN).

The TCU 810 may include a first communication module 812, and the first communication module 812 may receive an HD map provided through telematics. For example, the first communication module 812 may be configured to perform 'telematics communication'.

The first communication module 812 performing the telematics communication may communicate with a server and the like by using a satellite navigation system or a base station provided by mobile communications such as 4G or 5G.

The first communication module 812 may communicate with a telematics communication device 910. The telematics communication device 910 may include a server provided by a portal provider, a vehicle provider, and/or a mobile communication company.

The processor 830 of the path providing device 800 may determine absolute coordinates of road-related information (event information) based on ADAS MAP received from an external server (eHorizon) through the first communication module 812. In addition, the processor 830 may autonomously drive the vehicle or perform a vehicle control using the absolute coordinates of the road-related information (event information).

The TCU 810 may include a second communication module 814, and the second communication module 814 may receive various types of information provided through vehicle to everything (V2X) communication. For example, the second communication module 814 may be configured to perform 'V2X communication'. The V2X communication may be a technology of exchanging or sharing information, such as traffic condition and the like, while communicating with road infrastructures and other vehicles during driving.

The second communication module 814 may communicate with a V2X communication device 930. The V2X communication device 930 may include a mobile terminal associated with a pedestrian or a person riding a bike, a fixed terminal installed on a road, another vehicle, and the like.

Here, the another vehicle may denote at least one of vehicles existing within a predetermined distance from the vehicle 100 or vehicles approaching by a predetermined distance or shorter with respect to the vehicle 100.

The present disclosure may not be limited thereto, and the another vehicle may include all the vehicles capable of performing communication with the TCU 810. According to this specification, for the sake of explanation, an example will be described in which the another vehicle is at least one vehicle existing within a predetermined distance from the vehicle 100 or at least one vehicle approaching by a predetermined distance or shorter with respect to the vehicle 100.

The predetermined distance may be determined based on a distance capable of performing communication through the TCU 810, determined according to a specification of a product, or determined/varied based on a user's setting or V2X communication standard.

The second communication module 814 may be configured to receive LDM data from another vehicle. The LDM data may be a V2X message (BSM, CAM, DENM, etc.) transmitted and received between vehicles through V2X communication. The LDM data may include position information related to the another vehicle.

The processor 830 may determine a position of the vehicle 100 relative to the another vehicle, based on the position information related to the vehicle 100 and the position information related to the another vehicle included in the LDM data received through the second communication module 814.

In addition, the LDM data may include speed information regarding another vehicle. The processor 830 may also determine a relative speed of the another vehicle using speed information of the vehicle 100 and the speed information of the another vehicle. The speed information of the vehicle 100 may be calculated using a degree to which the location information of the vehicle received through the TCU 810 changes over time or calculated based on information received from the driving control apparatus 500 or the power train operating unit 610 of the vehicle 100.

The second communication module 814 may be the V2X communication unit 430 described above.

If the TCU 810 is a component that performs communication with a device located outside the vehicle 100 using wireless communication, the interface unit 820 may be a component performing communication with a device located inside the vehicle 100 using wired or wireless communication.

The interface unit 820 may receive information related to driving of the vehicle from most of electric components provided in the vehicle 100. Information transmitted from the electric component provided in the vehicle to the path providing device 800 is referred to as 'vehicle driving information (or vehicle travel information)'. For example, when the electric component is a sensor, the vehicle driving information may be sensing information sensed by the sensor.

Vehicle driving information may include vehicle information and surrounding information related to the vehicle. Information related to the inside of the vehicle with respect to a frame of the vehicle may be defined as the vehicle information, and information related to the outside of the vehicle may be defined as the surrounding information.

The vehicle information refers to information related to the vehicle itself. For example, the vehicle information may include a traveling speed, a traveling direction, an acceleration, an angular velocity, a location (GPS), a weight, a number of passengers on board the vehicle, a braking force of the vehicle, a maximum braking force, air pressure of each wheel, a centrifugal force applied to the vehicle, a driving (or travel) mode of the vehicle (autonomous driving mode or manual driving mode), a parking mode of the vehicle (autonomous parking mode, automatic parking mode, manual parking mode), whether or not a user is on board the vehicle, and information associated with the user.

The surrounding information refers to information related to another object located within a predetermined range around the vehicle, and information related to the outside of the vehicle. The surrounding information of the vehicle may be a state of a road surface on which the vehicle is traveling (e.g., a frictional force), the weather, a distance from a preceding (or following) vehicle, a relative speed of a preceding (or following) vehicle, a curvature of a curve when a driving lane is the curve, information associated with an object existing in a reference region (predetermined region) based on the vehicle, whether or not an object enters (or leaves) the predetermined region, whether or not the user exists near the vehicle, information associated with the user (for example, whether or not the user is an authenticated user), and the like.

The surrounding information may also include ambient brightness, temperature, a position of the sun, information related to a nearby subject (a person, another vehicle, a sign, etc.), a type of a driving road surface, a landmark, line information, and driving lane information, and information required for an autonomous driving/autonomous parking/automatic parking/manual parking mode.

In addition, the surrounding information may further include a distance from an object existing around the vehicle to the vehicle, collision possibility, a type of an object, a parking space for the vehicle, an object for identifying the parking space (for example, a parking line, a string, another vehicle, a wall, etc.), and the like.

The vehicle driving information is not limited to the example described above and may include all information generated from the components provided in the vehicle.

In some implementations, the processor 830 may be configured to control one or more electric components provided in the vehicle using the interface unit 820.

For example, the processor 830 may determine whether or not at least one of a plurality of preset conditions is satisfied, based on vehicle driving information received through the TCU 810. According to a satisfied condition, the processor 830 may control the one or more electric components in different ways.

In connection with the preset conditions, the processor 830 may detect an occurrence of an event in an electric component provided in the vehicle and/or application, and determine whether the detected event meets a preset condition. At this time, the processor 830 may also detect the occurrence of the event from information received through the TCU 810.

The application may be implemented, for example, as a widget, a home launcher, and the like, and may refer to various types of programs that can be executed on the vehicle. Accordingly, the application may be a program that performs various functions, such as a web browser, a video playback, message transmission/reception, schedule management, or application update.

In addition, the application may include at least one of forward collision warning (FCW), blind spot detection (BSD), lane departure warning (LDW), pedestrian detection (PD), Curve Speed Warning (CSW), and turn-by-turn navigation (TBT). For example, the occurrence of the event may be a missed call, presence of an application to be updated, a message arrival, start on, start off, autonomous travel on/off, pressing of an LCD awake key, an alarm, an incoming call, a missed notification, and the like.

In some implementations, the occurrence of the event may be a generation of an alert set in the advanced driver assistance system (ADAS), or an execution of a function set in the ADAS. For example, the occurrence of the event may be an occurrence of forward collision warning, an occurrence of blind spot detection, an occurrence of lane departure warning, an occurrence of lane keeping assist warning, or an execution of autonomous emergency braking.

In some implementations, the occurrence of the event may also be a change from a forward gear to a reverse gear, an occurrence of an acceleration greater than a predetermined value, an occurrence of a deceleration greater than a predetermined value, a change of a power device from an internal combustion engine to a motor, or a change from the motor to the internal combustion engine.

In addition, even when various electronic control units (ECUs) provided in the vehicle perform specific functions, it may be determined as the occurrence of the events. For example, when a generated event satisfies the preset condition, the processor 830 may control the interface unit 820 to display information corresponding to the satisfied condition on one or more displays provided in the vehicle.

Figure 10:
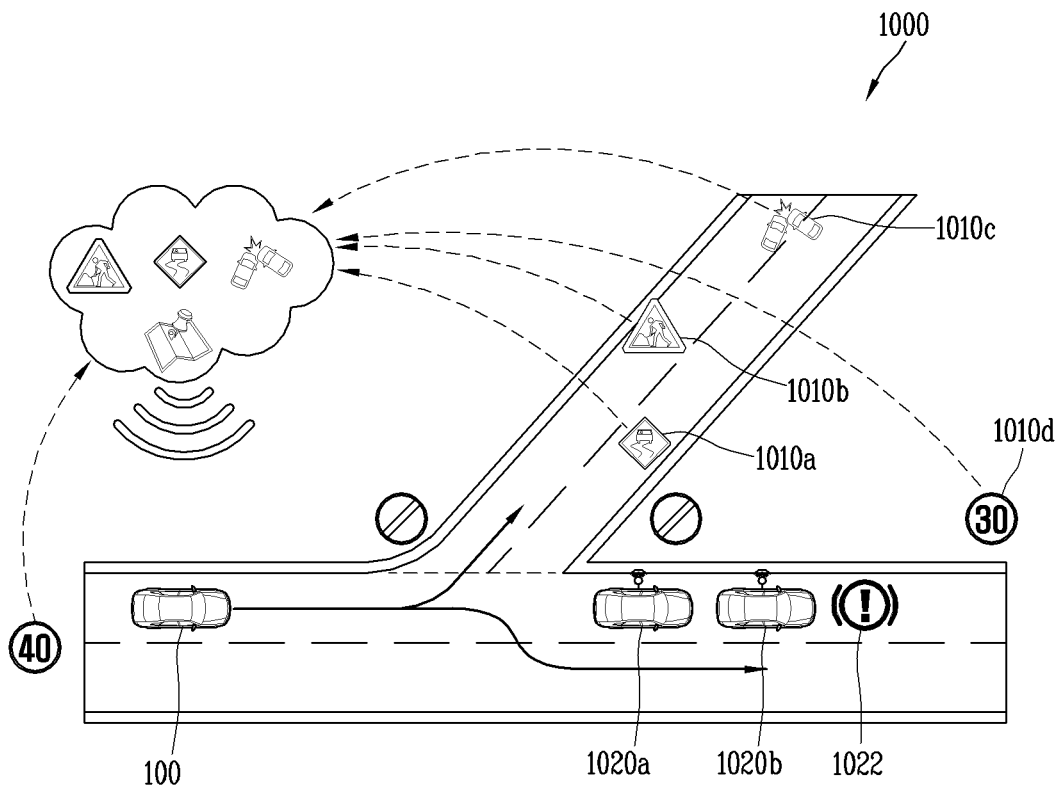
FIG. 10 is a diagram of an exemplary eHorizon.

FIG. 10 is a diagram of an exemplary eHorizon.

Referring to FIG. 10, the path providing device 800 may autonomously drive the vehicle 100 based on the eHorizon.

eHorizon may be classified into categories such as software, a system, and the like. The eHorizon denotes a configuration in which road shape information on a detailed map under a connected environment of an external server (cloud), V2X (Vehicle to everything) or the like and real-time events such as real-time traffic signs, road surface conditions, accidents and the like are merged to provide relevant information to autonomous driving systems and infotainment systems. For example, eHorizon may refer to an external server (a cloud or a cloud server). By way of further example, eHorizon may transfer a road shape on a high-definition map and real-time events with respect to the front of the vehicle to the autonomous driving system and the infotainment system under an external server/V2X environment.

In order to effectively transfer eHorizon data (information) transmitted from eHorizon (i.e., external server) to the autonomous driving system and the infotainment system, a data specification and transmission method may be formed in accordance with a technical standard called "Advanced Driver Assistance Systems Interface Specification (ADASIS)."

The path providing device 800 may use information, which is received from eHorizon, in the autonomous driving system and/or the infotainment system. For example, the autonomous driving system may be divided into a safety aspect and an ECO aspect.

In terms of the safety aspect, the vehicle 100 may perform an Advanced Driver Assistance System (ADAS) function such as Lane Keeping Assist (LKA), Traffic Jam Assist (TJA) or the like, and/or an AD (AutoDrive) function such as passing, road joining, lane change or the like, by using road shape information and event information received from eHorizon and surrounding object information sensed through the localization unit 840 provided in the vehicle 100.

Furthermore, in terms of the ECO aspect, the path providing device 800 may receive slope information, traffic light information, and the like related to a forward road from eHorizon, to control the vehicle so as to get efficient engine output, thereby enhancing fuel efficiency.

The infotainment system may include convenience aspect. For example, the vehicle 100 may receive from eHorizon accident information, road surface condition information, and the like related to a road ahead of the vehicle and output the received information on a display unit (for example, Head Up Display (HUD), CID, Cluster, etc.) provided in the vehicle, so as to provide guide information for the driver to drive the vehicle safely.

Referring to FIG. 10, the eHorizon (external server) may receive location information related to various types of event information (e.g., road surface condition information 1010a, construction information 1010b, accident information 1010c, etc.) occurred on roads and/or road-based speed limit information 1010d from the vehicle 100 or other vehicles 1020a and 1020b or may collect such information from infrastructures (e.g., measuring devices, sensing devices, cameras, etc.) installed on the roads.

Furthermore, the event information and the road-based speed limit information may be linked to map information or may be updated.

In addition, the location information related to the event information may be divided with respect to one or more lanes of a road.

By using such information, the eHorizon (external server) may provide information necessary for the autonomous driving system and the infotainment system to each vehicle, based on a high-definition map capable of determining a road situation (or road information) with respect to one or more lanes of the road. For example, the eHorizon (external server) may provide a high-definition map using coordinates of road-related information (for example, event information, position information regarding the vehicle 100, etc.) based on a high-definition map.

The road-related information provided by the eHorizon may be information corresponding to a predetermined region (predetermined space) with respect to the vehicle 100.

In some implementations, the path providing device 800 may acquire location information related to another vehicle through communication with the another vehicle. Communication with the another vehicle may be performed through V2X (Vehicle to everything) communication, and data transmitted/received to/from the another vehicle through the V2X communication may be data in a format defined by a Local Dynamic Map (LDM) standard.

The LDM denotes a conceptual data storage located in a vehicle control unit (or ITS station) including information related to a safe and normal operation of an application (or application program) provided in a vehicle (or an intelligent transport system (ITS)). The LDM may, for example, comply with EN standards.

The LDM differs from the foregoing ADAS MAP in the data format and transmission method. For an example, the ADAS MAP may correspond to a high-definition map having absolute coordinates received from eHorizon (external server), and the LDM may denote a high-definition map having relative coordinates based on data transmitted and received through V2X communication.

The LDM data (or LDM information) denotes data mutually transmitted and received through V2X communication (vehicle to everything) (e.g., V2V (Vehicle to Vehicle) communication, V2I (Vehicle to Infra) communication, or V2P (Vehicle to Pedestrian) communication).

The LDM may be implemented, for example, by a storage for storing data transmitted and received through V2X communication, and the LDM may be formed (stored) in a vehicle control device provided in each vehicle.

The LDM data may denote data exchanged between a vehicle and a vehicle (infrastructure, pedestrian) or the like, for an example. The LDM data may include a Basic Safety Message (BSM), a Cooperative Awareness Message (CAM), and a Decentralized Environmental Notification message (DENM), and the like, for example. For example, the LDM data may refer to a V2X message or an LDM message.

The vehicle control device may efficiently manage LDM data (or V2X messages) transmitted and received between vehicles using the LDM.

Based on LDM data received via V2X communication, the LDM may store, distribute to another vehicle, and continuously update all relevant information (e.g., a location, a speed, a traffic light status, weather information, a road surface condition, and the like of the vehicle (another vehicle)) related to a traffic situation around a place where the vehicle is currently located (or a road situation for an area within a predetermined distance from a place where the vehicle is currently located).

For example, a V2X application provided in the path providing device 800 registers in the LDM, and receives a specific message such as all the DENMs in addition to a warning about a failed vehicle. Then, the LDM may automatically assign the received information to the V2X application, and the V2X application may control the vehicle based on the information assigned from the LDM.

As described above, the vehicle 100 may be controlled by using the LDM formed by the LDM data collected through V2X communication.

The LDM may provide road-related information to the vehicle control device. The road-related information provided by the LDM provides only a relative distance and a relative speed with respect to another vehicle (or an event generation point), other than map information having absolute coordinates. For example, the vehicle 100 may perform autonomous driving using an ADAS MAP (absolute coordinates HD map) according to the ADASIS standard provided by eHorizon, but the map may be used only to determine a road condition in a surrounding area of the vehicle.

In addition, the vehicle 100 may perform autonomous driving using an LDM (relative coordinates HD map) formed by LDM data received through V2X communication, but there is a limitation in that accuracy is inferior due to insufficient absolute position information.

The path providing device 800 included in the vehicle 100 may generate a fused definition map using the ADAS MAP received from the eHorizon and the LDM data received through the V2X communication, and control (autonomously drive) the vehicle in an optimized manner using the fused definition map.

Figure 11A:
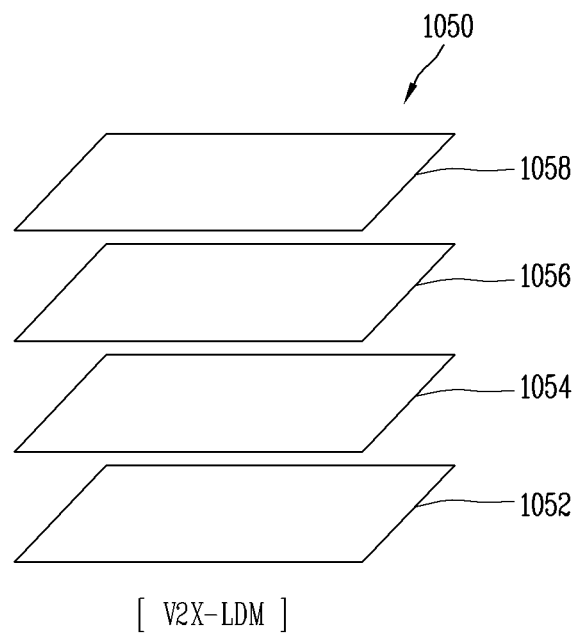
FIGS. 11A and 11B are diagrams illustrating examples of a Local Dynamic Map (LDM) and an Advanced Driver Assistance System (ADAS) MAP.
Figure 11B:
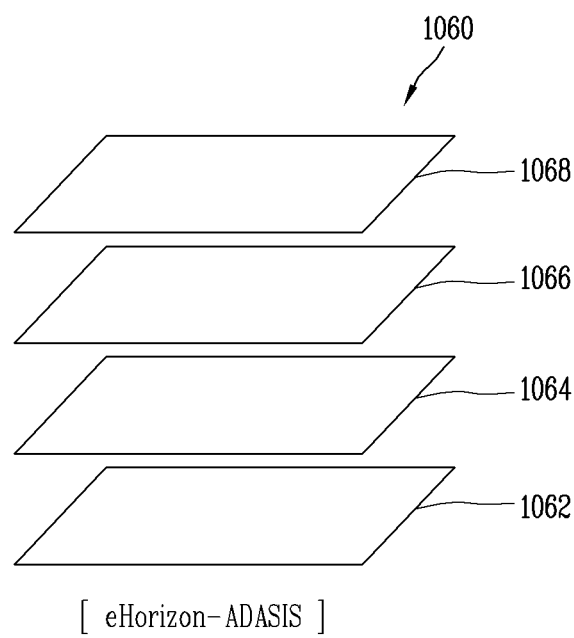

FIG. 11A illustrates an example of a data format of LDM data (or LDM) transmitted and received between vehicles via V2X communication, and FIG. 11B illustrates an example of a data format of an ADAS MAP received from an external server (eHorizon).

Referring to FIG. 11A, the LDM data (or LDM) 1050 may be formed to have four layers of data.

The LDM data 1050 may include a first layer 1052, a second layer 1054, a third layer 1056 and a fourth layer 1058.

The first layer 1052 may include static information, for example, map information, among road-related information.

The second layer 1054 may include landmark information (e.g., specific place information specified by a maker among a plurality of place information included in the map information) among information associated with roads. The landmark information may include location information, name information, size information, and the like.

The third layer 1056 may include traffic situation related information (e.g., traffic light information, construction information, accident information, etc.) among information associated with roads. The construction information and the accident information may include position information.

The fourth layer 1058 may include dynamic information (e.g., object information, pedestrian information, other vehicle information, etc.) among the road-related information. The object information, pedestrian information, and other vehicle information may include location information.

For example, the LDM data 1050 may include information sensed through a sensing unit of another vehicle or information sensed through a sensing unit of the vehicle of the present disclosure, and may include road-related information that is transformed in real time as it goes from the first layer to the fourth layer.

Referring to FIG. 11B, the ADAS MAP may be formed to have four layers of data similar to the LDM data.

The ADAS MAP 1060 may denote data received from eHorizon and formed to conform to the ADASIS specification.

The ADAS MAP 1060 may include a first layer 1062, a second layer 1064, a third layer 1066, and a fourth layer 1068.

The first layer 1062 may include topology information. The topology information, for example, is information that explicitly defines a spatial relationship, and may indicate map information.

The second layer 1064 may include landmark information (e.g., specific place information specified by a maker among a plurality of place information included in the map information) among information associated with the road. The landmark information may include position information, name information, size information, and the like.

The third layer 1066 may include high-definition map information. The high-definition map information may be referred to as an HD-MAP, and road-related information (e.g., traffic light information, construction information, accident information) may be recorded in the lane unit. The construction information and the accident information may include location information.

The fourth layer 1068 may include dynamic information (e.g., object information, pedestrian information, other vehicle information, etc.). The object information, pedestrian information, and other vehicle information may include location information.

For example, the ADAS MAP 1060 may include road-related information that is transformed in real time as it goes from the first layer to the fourth layer, similarly to the LDM data 1050.

The processor 830 may autonomously drive the vehicle 100. For example, the processor 830 may autonomously drive the vehicle 100 based on vehicle driving information sensed through various electric components provided in the vehicle 100 and information received through the TCU 810.

More specifically, the processor 830 may control the TCU 810 to acquire the location information of the vehicle. For example, the processor 830 may acquire the location information (location coordinates) of the vehicle 100 through the location information unit 420 of the TCU 810.

Furthermore, the processor 830 may control the first communication module 812 of the TCU 810 to receive map information from an external server. Here, the first communication module 812 may receive ADAS MAP from the external server (eHorizon). The map information may be included in the ADAS MAP.

In addition, the processor 830 may control the second communication module 814 of the TCU 810 to receive location information of another vehicle from the another vehicle. Here, the second communication module 814 may receive LDM data from the another vehicle. The location information of the another vehicle may be included in the LDM data.

The another vehicle denotes a vehicle existing within a predetermined distance from the vehicle 100, and the predetermined distance may be a communication-available distance of the TCU 810 or a distance set by a user.

The processor 830 may control the communication unit to receive the map information from the external server and the location information of the another vehicle from the another vehicle.

Furthermore, the processor 830 may fuse the acquired location information of the vehicle and the received location information of the another vehicle into the received map information, and control the vehicle 100 based on at least one of the fused map information or vehicle-related information sensed through the sensing unit 120.

Here, the map information received from the external server may denote highly detailed map information (HD-MAP) included in the ADAS MAP. The HD map information may be recorded with road-related information with respect to one or more lanes of a road.

The processor 830 may fuse the location information of the vehicle 100 and the location information of the another vehicle into the map information with respect to one or more lanes of a road. In addition, the processor 830 may fuse the road-related information received from the external server and the road-related information received from the another vehicle into the map information with respect to one or more lanes of a road.

The processor 830 may generate ADAS MAP required for the control of the vehicle using the ADAS MAP received from the external server and the vehicle-related information received through the sensing unit 120. More specifically, the processor 830 may apply the vehicle-related information sensed within a predetermined range through the sensing unit 120 to the map information received from the external server. Here, the predetermined range may be an available distance which can be sensed by an electric component provided in the vehicle 100 or may be a distance set by a user.

The processor 830 may control the vehicle by applying the vehicle-related information sensed within the predetermined range through the sensing unit to the map information and then additionally fusing the location information of the another vehicle thereto. For example, when the vehicle-related information sensed within the predetermined range through the sensing unit is applied to the map information, the processor 830 may only use the information within the predetermined range from the vehicle, and thus a range capable of controlling the vehicle may be local.

However, the location information of the another vehicle received through the V2X module may be received from the another vehicle located out of the predetermined range. It may be because the communication-available distance of the V2X module communicating with the another vehicle through the V2X module is farther than a predetermined range of the localization unit 840.

As a result, the processor 830 may fuse the location information of the another vehicle included in the LDM data received through the second communication module 814 into the map information on which the vehicle-related information has been sensed, so as to acquire the location information of the another vehicle located in a broader range and more effectively control the vehicle using the acquired information. For example, it is assumed that a plurality of other vehicles is crowded ahead in a lane in which the vehicle 100 travels, and it is also assumed that the sensing unit can sense only location information related to the immediately preceding vehicle. In this case, when only vehicle-related information sensed within a predetermined range on map information is used, the processor 830 may generate a control command to control the vehicle such that the vehicle overtakes the preceding vehicle.

However, a plurality of other vehicles may be actually present ahead, which may make the vehicle difficult to overtake the other vehicles. At this time, the vehicle 100 may acquire the location information of another vehicle received through the V2X module. Here, the received location information of the another vehicle may include location information related to not only the vehicle immediately in front of the vehicle 100 (or the preceding vehicle) but also a plurality of other vehicles in front of the preceding vehicle.

The processor 830 may additionally fuse the location information related to the plurality of other vehicles acquired through the V2X module into map information to which the vehicle-related information is applied, so as to determine a situation where it is inappropriate to overtake the preceding vehicle.

With such configuration, the vehicle 100 can overcome the technical limitation associated with conventional systems that only vehicle-related information acquired through the sensing unit 120 is merely fused to high-definition map information and thus autonomous driving is enabled only within a predetermined range. For example, vehicle 100 can achieve more accurate and stable vehicle control by additionally fusing information related to other vehicles (e.g., speeds, locations of other vehicles), which have been received from the other vehicles located at a farther distance than the predetermined range through the V2X module, as well as vehicle-related information sensed through the sensing unit, into map information.

Vehicle control described herein may include at least one of autonomously driving the vehicle 100 or outputting a warning message associated with the driving of the vehicle.

Hereinafter, description will be given in more detail of a method in which a processor controls a vehicle using LDM data received through a V2X module, ADAS MAP received from an external server (eHorizon), and vehicle-related information sensed through a sensing unit provided in the vehicle, with reference to the accompanying drawings.

Figure 12A:
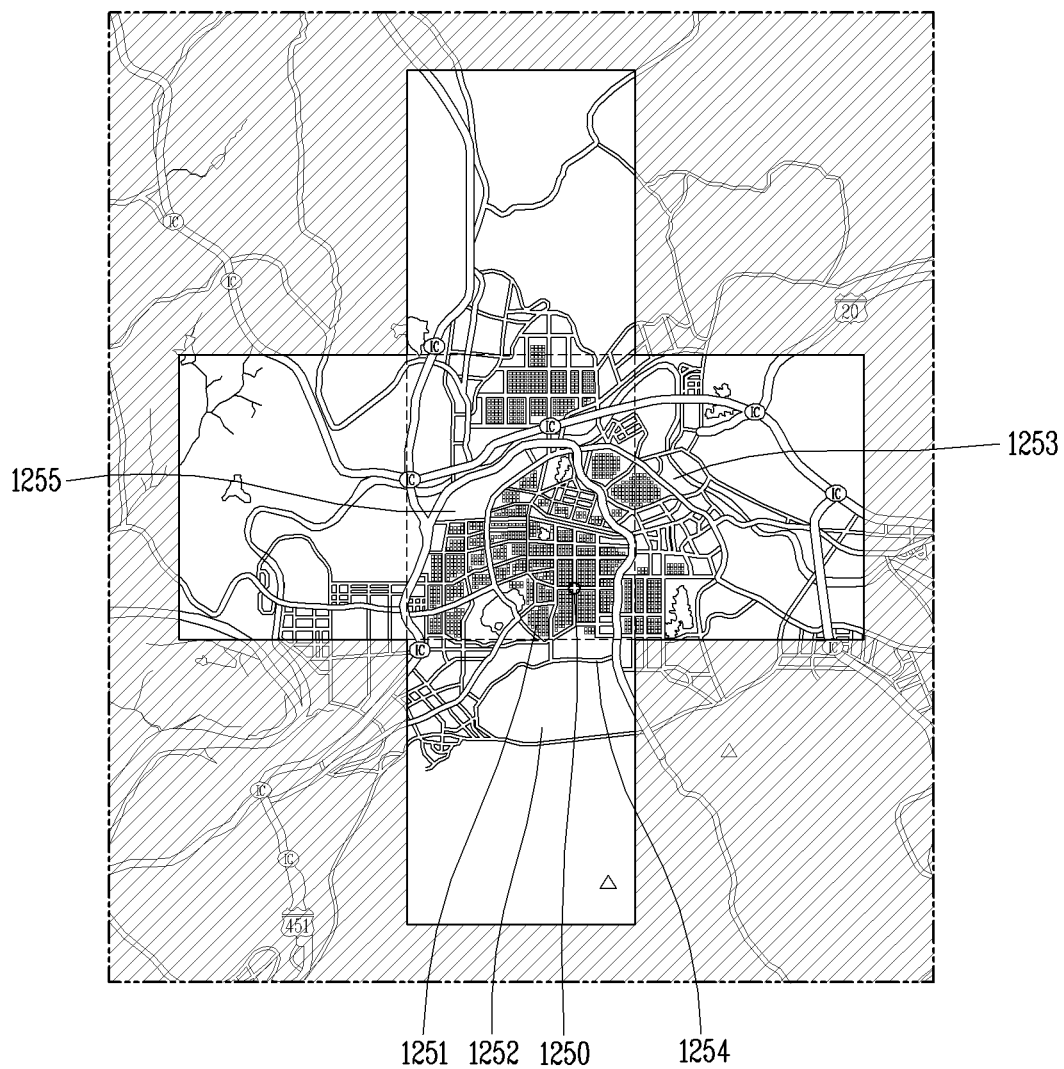
FIGS. 12A and 12B are diagrams illustrating examples of method of receiving high-definition map data by a path providing device of FIG. 8.
Figure 12B:
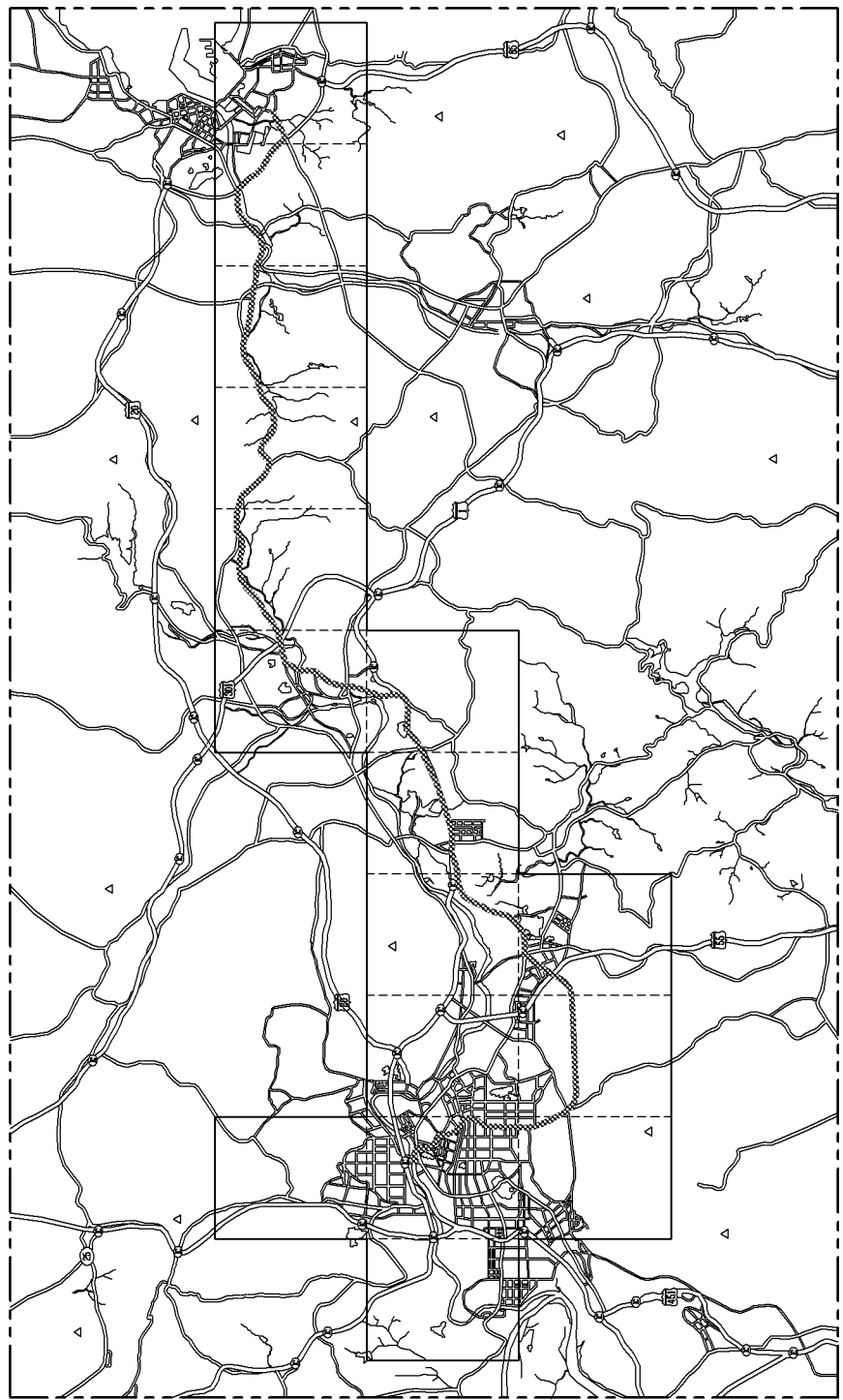

FIGS. 12A and 12B are exemplary views illustrating a method in which a communication device receives high-definition map data.

The server may divide HD map data into tile units and provide them to the path providing device 800. The processor 830 may receive HD map data in the tile units from the server or another vehicle through the TCU 810. Hereinafter, HD map data received in tile units is referred to as 'HD map tile'.

The HD map data is divided into tiles having a predetermined shape, and each tile corresponds to a different portion of the map. By connecting all the tiles, the full HD map data may be acquired. Since the HD map data has a high capacity, the vehicle 100 may be provided with a high-capacity memory in order to download and use the full HD map data. As communication technologies are developed, it is more efficient to download, use, and delete HD map data in tile units, rather than to provide the high-capacity memory in the vehicle 100.

For the convenience of description, a case in which the predetermined shape is rectangular is described as an example, but the predetermined shape may be modified to various polygonal shapes.

The processor 830 may store the downloaded HD map tile in the memory 140. The processor 830 may delete the stored HD map tile. For example, the processor 830 may delete the HD map tile when the vehicle 100 leaves an area corresponding to the HD map tile. By way of further example, the processor 830 may delete the HD map tile when a preset time elapses after storage.

As illustrated in FIG. 12A, when there is no preset destination, the processor 830 may receive a first HD map tile 1251 including a location (position) 1250 of the vehicle 100. The server receives data of the location 1250 of the vehicle 100 from the vehicle 100, and transmits the first HD map tile 1251 including the location 1250 of the vehicle 100 to the vehicle 100. In addition, the processor 830 may receive HD map tiles 1252, 1253, 1254, and 1255 around the first HD map tile 1251. For example, the processor 830 may receive the HD map tiles 1252, 1253, 1254, and 1255 that are adjacent to top, bottom, left, and right sides of the first HD map tile 1251, respectively. In this case, the processor 830 may receive a total of five HD map tiles. For example, the processor 830 may further receive HD map tiles located in a diagonal direction, together with the HD map tiles 1252, 1253, 1254, and 1255 adjacent to the top, bottom, left, and right sides of the first HD map tile 1251. In this case, the processor 830 may receive a total of nine HD map tiles.

As illustrated in FIG. 12B, when there is a preset destination, the processor 830 may receive tiles associated with a path from the location 1250 of the vehicle 100 to the destination. The processor 830 may receive a plurality of tiles to cover the path.

In some implementations, the processor 830 may receive all the tiles covering the path at one time.

Alternatively, the processor 830 may receive the entire tiles in a dividing manner while the vehicle 100 travels along the path. For example, the processor 830 may receive only some of the entire tiles based on the location of the vehicle 100 while the vehicle 100 travels along the path. Thereafter, the processor 830 may continuously receive tiles during the travel of the vehicle 100 and delete the previously received tiles.

The processor 830 may generate electronic horizon data based on the HD map data.

The vehicle 100 may travel in a state where a final destination is set. The final destination may be set based on a user input received via the user interface apparatus 200 or the communication apparatus 400. According to some implementations, the final destination may be set by the driving system 710.

In the state where the final destination is set, the vehicle 100 may be located within a preset distance from a first point during driving. When the vehicle 100 is located within the preset distance from the first point, the processor 830 may generate electronic horizon data having the first point as a start point and a second point as an end point. The first point and the second point may be points on the path heading to the final destination. The first point may be described as a point where the vehicle 100 is located or will be located in the near future. The second point may be described as the horizon described above.

The processor 830 may receive an HD map of an area including a section from the first point to the second point. For example, the processor 830 may request an HD map for an area within a predetermined radial distance from the section between the first point and the second point and receive the requested HD map.

The processor 830 may generate electronic horizon data for the area including the section from the first point to the second point, based on the HD map. The processor 830 may generate horizon map data for the area including the section from the first point to the second point. The processor 830 may generate horizon path data for the area including the section from the first point to the second point. The processor 830 may generate a main path for the area including the section from the first point to the second point. The processor 830 may generate data of a sub path for the area including the section from the first point to the second point.

When the vehicle 100 is located within a preset distance from the second point, the processor 830 may generate electronic horizon data having the second point as a start point and a third point as an end point. The second point and the third point may be points on the path heading to the final destination. The second point may be described as a point where the vehicle 100 is located or will be located in the near future. The third point may be described as the horizon described above. In some implementations, the electronic horizon data having the second point as the start point and the third point as the end point may be geographically connected to the electronic horizon data having the first point as the start point and the second point as the end point.

The operation of generating the electronic horizon data using the second point as the start point and the third point as the end point may be performed by correspondingly applying the operation of generating the electronic horizon data having the first point as the start point and the second point as the end point.

According to some implementations, the vehicle 100 may travel even when the final destination is not set.

Figure 13:
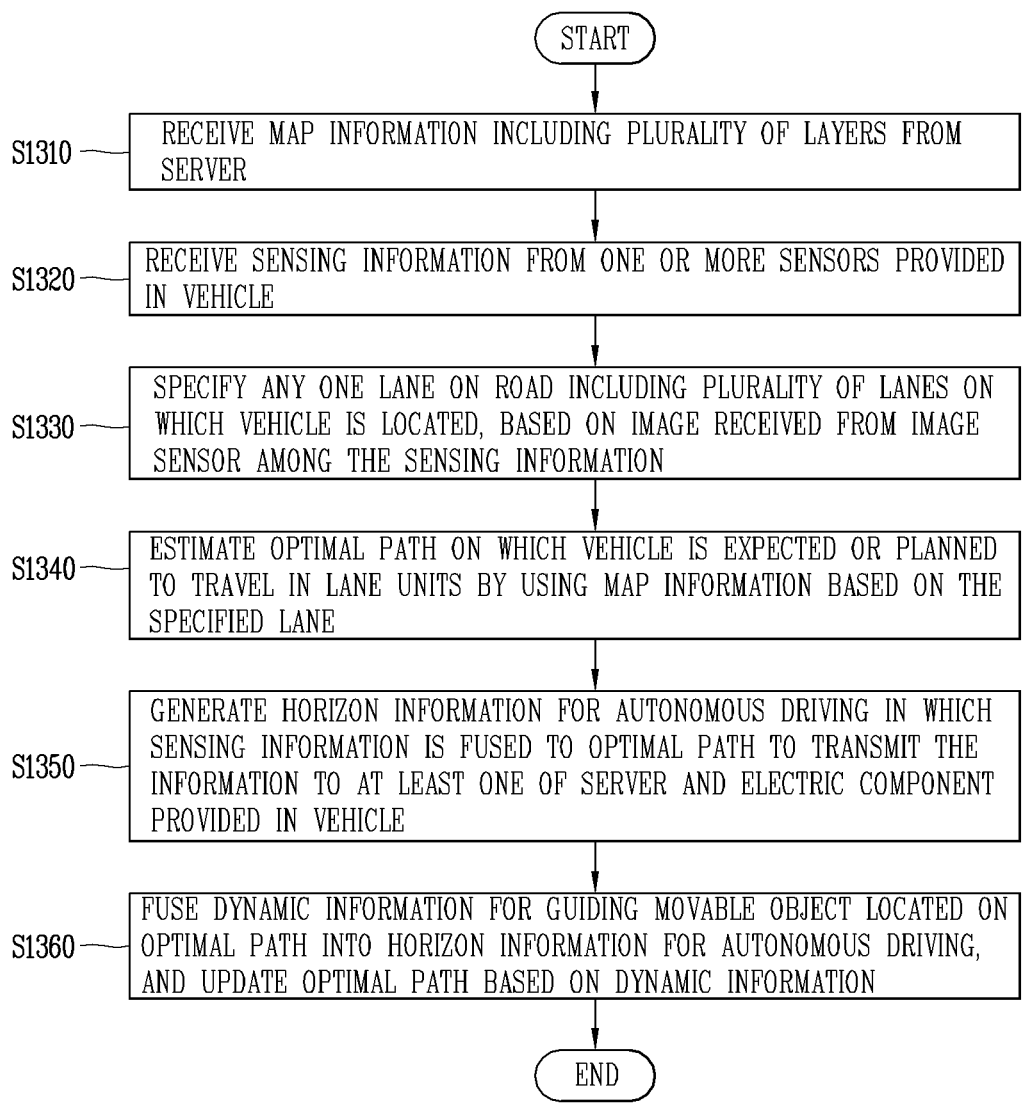
FIG. 13 is a flowchart of an example of generating horizon information for autonomous driving by receiving high-definition map by the path providing device.

FIG. 13 is a flowchart of an exemplary path providing method of the path providing device of FIG. 9.

The processor 830 may receive a high-definition (HD) map from an external server. Specifically, the processor 830 may receive map information (high-definition map) including a plurality of layers of data from a server (external server, cloud server) [S1310].

The external server is a device capable of performing communication through the first communication module 812 and is an example of the telematics communication device 910. The high-definition (HD) map includes a plurality of layers of data. The HD map is ADAS MAP and may include at least one of the four layers described above with reference to FIG. 11B.

The map information may include horizon map data described above. The horizon map data may refer to an ADAS MAP including a plurality of layers of data while satisfying the ADASIS standard described in FIG. 11B.

Moreover, the processor 830 of the path providing device 800 may receive sensing information from one or more sensors provided in the vehicle [S1320]. The sensing information may refer to information sensed by each sensor (or information processed after being sensed). The sensing information may include various information according to a type of data sensed by the sensor.

The processor 830 may specify any one lane on a road including a plurality of lanes on which the vehicle 100 is located based on an image received from an image sensor among the sensing information [S1330]. Here, the lane may refer to a lane on which the vehicle 100 equipped with the path providing device 800 is currently traveling.

The processor 830 may determine a lane on which the vehicle 100 equipped with the path providing device 800 is traveling by using (analyzing) an image received from an image sensor (or camera) among the sensors.

In addition, the processor 830 may estimate an optimal path in lane units on which the vehicle 100 is expected or planned to travel by using map information based on the specified lane [S1340]. Here, the optimal path may refer to the horizon path data or main path described above. However, the present disclosure is not limited thereto, and the optimal path may further include a sub path. Here, the optimal path may refer to as Most Preferred Path or Most Probable Path, and may be abbreviated as MPP.

That is, the processor 830 may use map information to estimate or plan an optimal path in lane units on which the vehicle 100 may travel to a destination based on a specific lane on which the vehicle 100 is traveling.

The processor 830 may generate horizon information for autonomous driving in which sensing information is fused to an optimal path to transmit the information to at least one of the server or an electric component provided in the vehicle [S1350].

Here, the horizon information for autonomous driving may refer to electronic horizon information (or electronic horizon data) described above. The horizon information for autonomous driving is information (or data, environment) used when the vehicle 100 performs autonomous driving in lane units. The information may refer to environment data for autonomous driving in which all information (map information, vehicles, objects, moving objects, environment, weather, etc.) within a predetermined range is fused based on a road including an optimal path on which the vehicle 100 will travel or an optimal path, as illustrated in FIG. 10. The environment data for autonomous driving may refer to data (or a comprehensive data environment) that is a basis for the processor 830 of the vehicle 100 to autonomously drive the vehicle 100 or a basis in calculating an optimal path of the vehicle 100.

In some implementations, the horizon information for autonomous driving may refer to information for guiding a driving path in lane units. The horizon information for autonomous driving is information in which at least one of sensing information or dynamic information is fused to an optimal path, and finally, may be information to guide a vehicle a driving path in lane units.

When the horizon information for autonomous driving refers to information for guiding a driving path in lane units, the processor 830 may generate different horizon information for autonomous driving depending on whether a destination is set in the vehicle 100. For example, when a destination is set in the vehicle 100, the processor 830 may generate horizon information for autonomous driving for guiding a driving path (travel path) to the destination in lane units. By way of further example, when a destination is not set in the vehicle 100, the processor 830 may calculate a main path (Most Preferred Path (MPP)) on which the vehicle 100 is most likely to travel, and generate horizon information for autonomous driving for guiding the main path (MPP) in the lane units. In this case, the horizon information for autonomous driving may further include sub path information related to a sub path, which is branched from the main path (MPP) and on which the vehicle 100 is likely to travel with a higher probability than a predetermined reference.

The horizon information for autonomous driving may provide a driving path up to a destination for each lane drawn on the road, thereby providing more precise and detailed path information. The horizon information for autonomous driving may be path information that complies with the standard of ADASIS v3.

The processor 830 may fuse dynamic information for guiding a movable object located on an optimal path to horizon information for autonomous driving, and update the optimal path based on the dynamic information [S1360]. The dynamic information may be included in map information received from a server, and may be information included in any one of a plurality of layers (e.g., information included in the fourth layer 1068).

The description given above is summarized as follows.

The processor 830 may generate horizon information for autonomous driving for guiding a road located ahead of the vehicle in lane units by using the HD map.

The processor 830 may receive sensing information from one or more sensors provided in the vehicle 100 through the interface unit 820. The sensing information may be vehicle driving information.

The processor 830 may specify any one lane on a road including a plurality of lanes on which the vehicle is located, based on an image received from an image sensor among the sensing information. For example, when the vehicle 100 is driving on a first lane of an 8-lane road, the processor 830 may specify the first lane as a lane on which the vehicle 100 is located based on the image received from the image sensor.

The processor 830 may estimate an optimal path in lane units on which the vehicle is expected or planned to travel by using the map information based on the specified lane.

Here, the optimal path may refer to as Most Preferred Path or Most Probable Path, and may be abbreviated as MPP.

The vehicle 100 may autonomously drive along the optimal path. Ina case of manual driving, the vehicle 100 may provide navigation information that guides the optimal path to a driver.

The processor 830 may generate horizon information for autonomous driving in which the sensing information is fused to the optimal path. The horizon information for autonomous driving may be referred to as 'eHorizon' or 'Electronic Horizon' or 'Electronic Horizon Data'.

The processor 830 may use different horizon information for autonomous driving according to whether a destination is set in the vehicle 100.

For example, when a destination is set in the vehicle 100, the processor 830 may generate an optimal path in lane units for guiding a driving path (travel path) to the destination by using horizon information for autonomous driving. By way of further example, when a destination is not set in the vehicle 100, the processor 830 may calculate a main path in lane units on which the vehicle 100 is most likely to travel by using horizon information for autonomous driving. In this case, the horizon information for autonomous driving may further include sub path information related to a sub path, which is branched from the main path (MPP) and on which the vehicle 100 is likely to travel with a higher probability than a predetermined reference.

The horizon information for autonomous driving may be configured to provide a driving path up to a destination for each lane drawn on the road, thereby providing more precise and detailed path information. The path information may be path information that complies with the standard of ADASIS v3.

The horizon information for autonomous driving may be configured to provide a subdivision of a path in lane units on which a vehicle should travel or allowed to travel. The horizon information for autonomous driving may include information for guiding a driving path to a destination in lane units. When the horizon information for autonomous driving is displayed on a display mounted on the vehicle 100, guide lines for guiding lanes on a map on which a vehicle is allowed to travel and information within a predetermined range based on the vehicle (e.g., a road, landmarks, other vehicles, surrounding objects, weather information, etc.) may be displayed. In addition, a graphic object indicating the location of the vehicle 100 may be included on at least one lane in which the vehicle 100 is located among a plurality of lanes included in the map.

Dynamic information for guiding a movable object located on the optimal path may be fused to the horizon information for autonomous driving. The dynamic information is received by the processor 830 through the TCU 810 and/or the interface unit 820, and the processor 830 may update the optimal path based on the dynamic information. As the optimal path is updated, the horizon information for autonomous driving is also updated.

The dynamic information may include dynamic data.

The processor 830 may provide the horizon information for autonomous driving to at least one electronic component provided in the vehicle. In addition, the processor 830 may also provide the horizon information for autonomous driving to various applications installed in the systems of the vehicle 100.

The electric component may refer to any device mounted on the vehicle 100 and capable of performing communication, and may include the components 120 to 700 described above with reference to FIG. 7. For example, the object detecting apparatus 300 such as a radar or a LiDAR, the navigation system 770, the vehicle operating device 600, and the like may be included in the electric components.

In addition, the electrical component may further include an application executable in the processor 830 or a module that executes the application.

The electric component may perform its own function based on the horizon information for autonomous driving.

The horizon information for autonomous driving may include a path in lane units and the location of the vehicle 100, and may include dynamic information including at least one object to be sensed by the electric component. The electric component may reallocate resources to sense an object corresponding to the dynamic information, determine whether the dynamic information matches sensing information sensed by the electric component itself, or change a setting value for generating sensing information.

The horizon information for autonomous driving includes a plurality of layers, and the processor 830 may selectively transmit at least one of the layers according to an electronic component receiving the horizon information for autonomous driving.

Specifically, the processor 830 may select at least one of a plurality of layers in which the path providing device is included in the horizon information for autonomous driving, based on at least one of a function executed by the electronic component or a function to be executed. In addition, the processor 830 may transmit a selected layer to the electronic component, and may not transmit unselected layers to the electronic component.

The processor 830 may receive external information generated by an external device from the external device which is located within a predetermined range with respect to the vehicle.

The predetermined range refers to a distance at which the second communication module 814 can perform communication, and may vary according to performance of the second communication module 814. When the second communication module 814 performs V2X communication, a V2X communication-available range may be defined as the predetermined range.

Furthermore, the predetermined range may vary according to an absolute speed of the vehicle 100 and/or a relative speed with the external device.

The processor 830 may determine the predetermined range based on the absolute speed of the vehicle 100 and/or the relative speed with the external device, and permit the communication with external devices located within the determined predetermined range.

Specifically, based on the absolute speed of the vehicle 100 and/or the relative speed with the external device, external devices that can perform communication through the second communication module 814 may be classified into a first group or a second group. External information received from external devices included in the first group is used to generate dynamic information, which will be described below, but external information received from external devices included in the second group is not used to generate the dynamic information. Even when external information is received from the external devices included in the second group, the processor 830 may ignore the external information.

The processor 830 may generate dynamic information related to an object to be sensed by at least one electric component provided in the vehicle based on the external information, and match the dynamic information to the horizon information for autonomous driving. For example, the dynamic information may correspond to the fourth layer described above with reference to FIGS. 11A and 11B.

As described above with respect to FIGS. 11A and 11B, the path providing device 800 may receive the ADAS MAP and/or the LDM data. Specifically, the path providing device 800 may receive the ADAS MAP from the telematics communication device 910 through the first communication module 812, and the LDM data from the V2X communication device 930 through the second communication module 814.

The ADAS MAP and the LDM data may be provided with a plurality of layers of data each having the same format. The processor 830 may select at least one layer from the ADAS MAP, select at least one layer from the LDM data, and generate the horizon information for autonomous driving including the selected layers. For example, after selecting the first to third layers of the ADAS MAP and selecting the fourth layer of the LDM data, one horizon information for autonomous driving may be generated by matching those four layers into one. In this case, the processor 830 may transmit a refusal message for refusing the transmission of the fourth layer to the telematics communication device 910. This is because receiving partial information excluding the fourth layer uses less resources of the first communication module 812 than receiving all information including the fourth layer. By matching part of the ADAS MAP with part of the LDM data, complementary information can be utilized.

In some implementations, after selecting the first to fourth layers of the ADAS MAP and selecting the fourth layer of the LDM data, one horizon information for autonomous driving may be generated by matching those five layers into one. In this case, priority may be given to the fourth layer of the LDM data. If the fourth layer of the ADMS MAP includes information which does not match the fourth layer of the LDM data, the processor 830 may delete the mismatched information or correct the mismatched information based on the LDM data.

The dynamic information may be object information for guiding a predetermined object. For example, the dynamic information may include at least one of position coordinates for guiding the position of the predetermined object, and information guiding the shape, size, and kind of the predetermined object.

The predetermined object may refer to an object that disturbs driving in a corresponding lane among objects that can be driven on a road.

For example, the predetermined object may include a bus stopped at a bus stop, a taxi stopped at a taxi stand or a truck from which articles are being put down. By way of further example, the predetermined object may include a garbage truck that travels at a predetermined speed or slower or a large-sized vehicle (e.g., a truck or a container truck, etc.) that is determined to obstruct a driver's vision. As another example, the predetermined object may include an object informing of an accident, road damage or construction.

As described above, the predetermined object may include all kinds of objects blocking a lane so that driving of the vehicle 100 is impossible or interrupted. The predetermined object may correspond to an icy road, a pedestrian, another vehicle, a construction sign, a traffic signal such as a traffic light, or the like that the vehicle 100 should avoid, and may be received by the path providing device 800 as the external information.

The processor 830 may determine whether or not the predetermined object guided by the external information is located within a reference range based on the travel path of the vehicle 100. Whether or not the predetermined object is located within the reference range may vary depending on a lane in which the vehicle 100 is traveling and the position of the predetermined object. For example, external information for guiding a sign indicating the construction on a third lane 1 km ahead of the vehicle while the vehicle is traveling in a first lane may be received. If the reference range is set to 1 m based on the vehicle 100, the sign is located outside the reference range. This is because the third lane is located outside the reference range of 1 m based on the vehicle 100 if the vehicle 100 is continuously traveling in the first lane. On the other hand, if the reference range is set to 10 m based on the vehicle 100, the sign is located within the reference range.

The processor 830 may generate the dynamic information based on the external information when the predetermined object is located within the reference range, but may not generate the dynamic information when the predetermined object is located outside the reference range. That is, the dynamic information may be generated only when the predetermined object guided by the external information is located on the driving path of the vehicle 100 or is within a reference range that may affect the driving path of the vehicle 100.

The path providing device may generate horizon information for autonomous driving by integrating information received through the first communication unit and information received through the second communication unit into one, which may result in generating and providing horizon information for autonomous driving capable of complementing different types of information provided through such different communication units. This is because information received through the first communication unit cannot reflect information in real time but such limitation can be complemented by information received through the second communication unit.

Furthermore, when there is information received through the second communication unit, the processor 830 may control the first communication unit so as not to receive information corresponding to the received information, so that the bandwidth of the first communication unit can be used less than that used in the related art. That is, the resource usage of the first communication unit can be minimized.

Hereinafter, a path providing device and a control method thereof capable of including at least one component as described above will be described in more detail with reference to the accompanying drawings.

Figure 14:
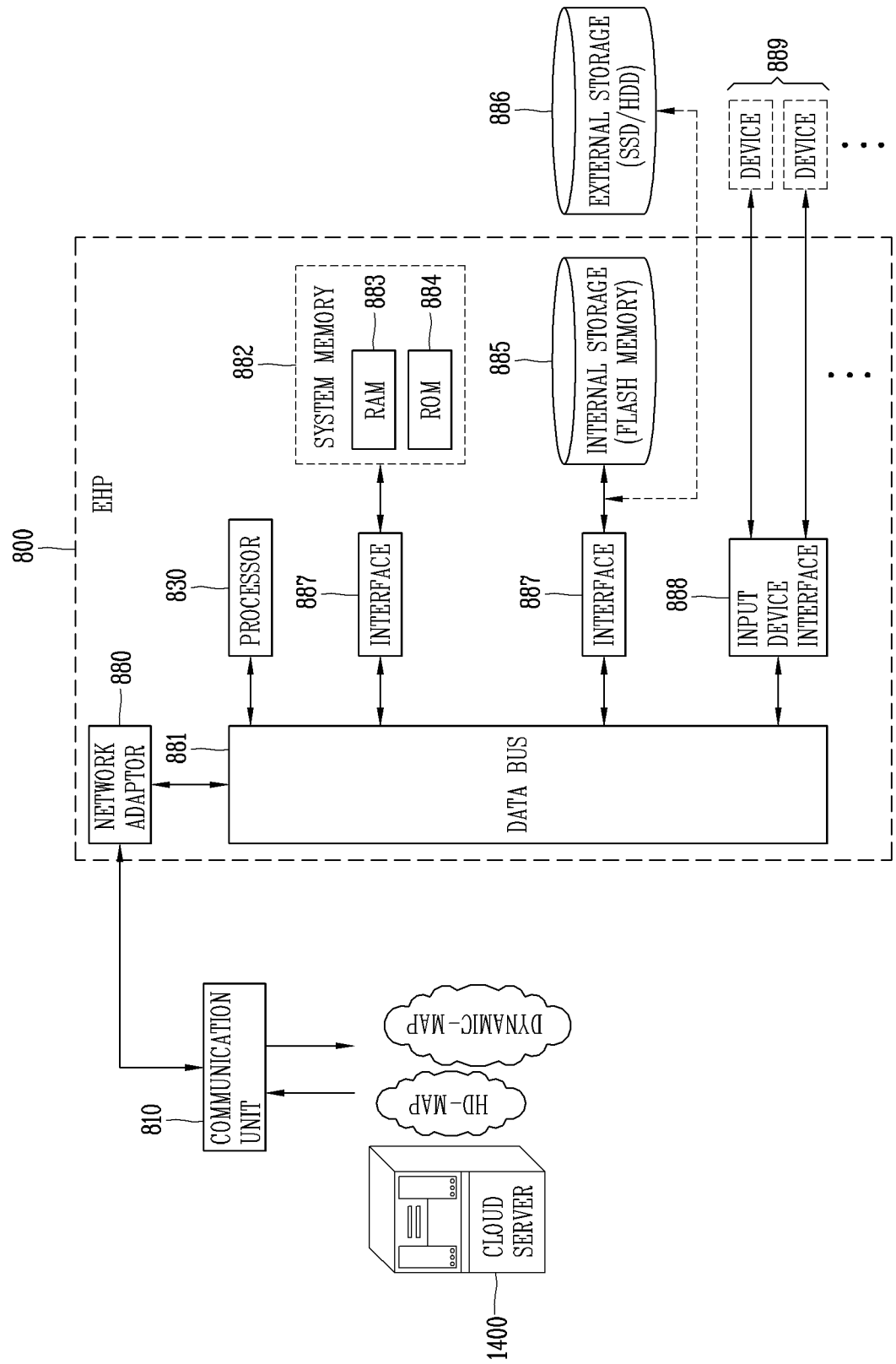
FIG. 14 is a conceptual view illustrating a memory.
Figure 15A:
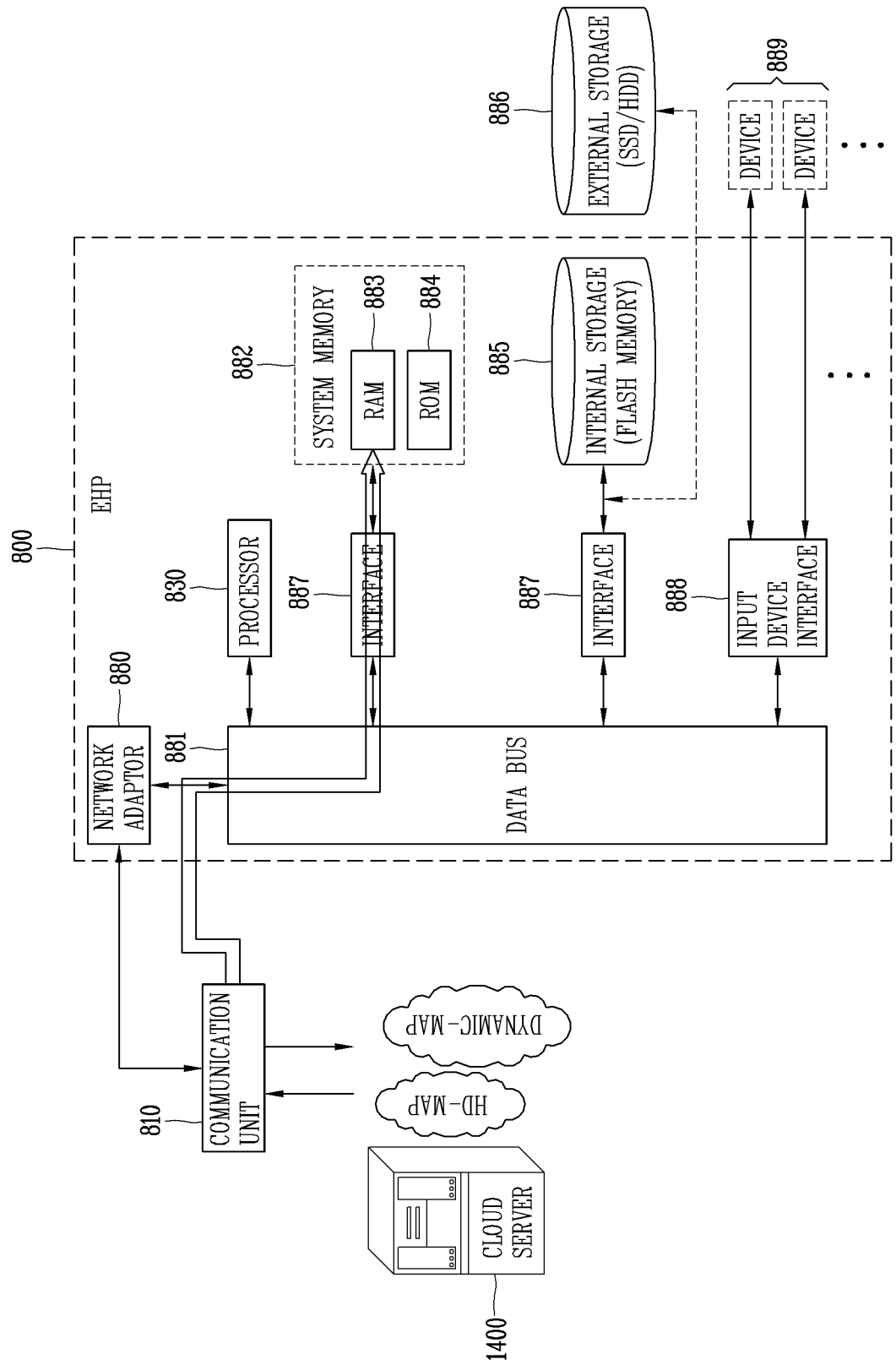
FIGS. 15A and 15B are conceptual views illustrating an exemplary method for storing data received in a path providing device in a memory.
Figure 15B:
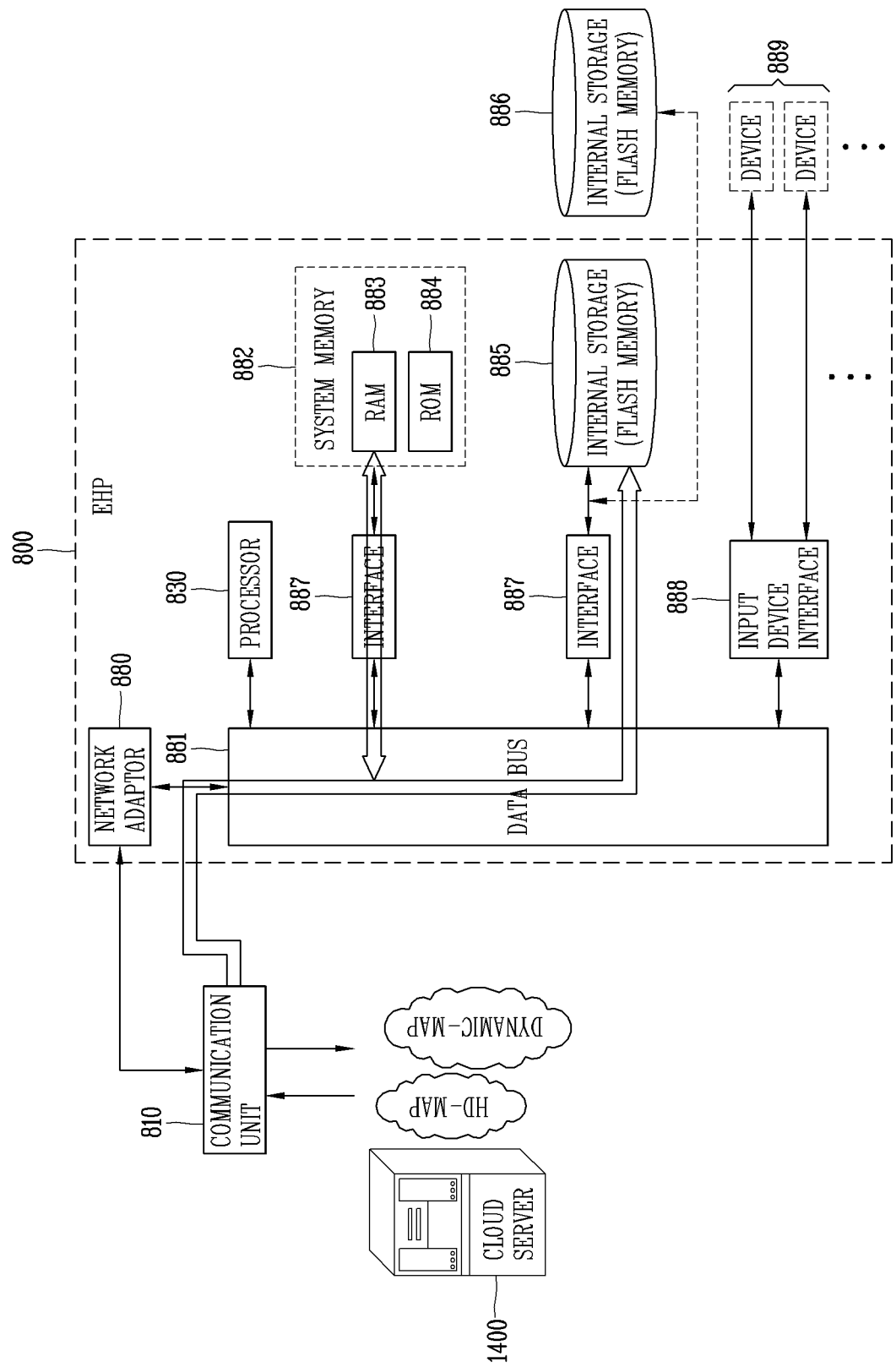

FIG. 14 is a conceptual view of an exemplary memory, and FIGS. 15A and 15B are conceptual views illustrating an exemplary method of storing data received in a path providing device in a memory.

The path providing device may include a memory 882 and a memory 885 configured to store information used in estimating or updating an optimal path.

The information used in estimating or updating an optimal path may include at least one of map information, sensing information, dynamic information, or horizon information for autonomous driving, and may also include the optimal path itself.

The memory may include a plurality of memories 882 and 885 to be stored in different storage spaces according to types of information used in estimating or updating an optimal path.

Here, different storage spaces may refer to different memories.

The path providing device 800 may include the communication unit 810 as described above. However, as illustrated in FIG. 14, the TCU 810 may be provided outside the path providing device 800 to perform wired communication (e.g., CAN communication).

When the TCU 810 exists outside the path providing device, the TCU 810 may be a communication apparatus 400 provided in a vehicle.

In some implementations, the path providing device 800 may include a network adapter 880 that receives information (e.g., map information or dynamic information) transmitted from the server 1400 through the TCU 810.

The network adapter 880 may convert a signal corresponding to information received through the TCU 810 into a signal that can be processed by the path providing device 800.

A data bus 881 serving as a path to transmit information to various modules included in the path providing device 800 may be connected to the network adapter 880.

The data bus 881 may transmit information converted by the network adapter 880 to at least one of various components included in the path providing device 800 (e.g., processor 830, first memory 883, second memory 885, etc.) or electric components provided in the vehicle.

That is, the data bus 881 may be a path for transmitting a signal of information (or data) received through the network adapter 880 to a module (or processing unit) provided in the path providing device 800.

Here, the data bus 881 may transmit data (or information) through a controller area network (CAN) communication, or may transmit data (or information) to at least one of components provided in the path providing device 800 or electric components provided in the vehicle through a circuit provided on a printed circuit board.

The processor 830 is connected to the data bus 881, and may control components included in the path providing device 800 or give commands through the data bus 881, or receive information (or data) from the components.

Referring back to FIG. 14, the memory included in the path providing device 800 may include a system memory 882 and an internal storage (or flash memory) 885.

The system memory 882 may include a random access memory (RAM) 883 and a read only memory (ROM) 884.

The RAM 883 is a memory capable of reading stored (memorized) information and storing (memorizing) other information, and may be used for main memory of a computer, temporary loading of an application program, temporary storage of data, and the like. The RAM 883 is a volatile memory in which even recorded information is lost when power supply is interrupted. The RAM 883 is configured to temporarily store data while power is supplied, and is referred to as a first memory 883.

The ROM 884 may refer to a memory that can read data at a high speed, but cannot write again. For example, the ROM 884 may refer to a read-only memory. The ROM is a non-volatile memory in which information is not lost even when power is turned off. However, since the ROM can be read as a memory but cannot be changed, it is not included as a memory controlled by the path providing device.

The internal storage (flash memory) 885 may refer to a non-volatile memory in which information stored therein is not erased even when power is turned off. The internal storage 885 is included in the path providing device 800, and information stored therein may be maintained without disappearing even when power consumption is low and power is turned off.

The internal storage 885 may simultaneously have an advantage of ROM in which information stored therein is preserved even when power supply is interrupted and an advantage of RAM in which information is freely input and output. In addition, the internal storage 885 is also advantageous in that it is fast and has low power consumption. The internal storage 885 is configured to store data even when power supply is interrupted. In this specification, the internal storage 885 will be referred to as a second memory 885.

Meanwhile, the processor 830 of the path providing device 800 may further store information in an external storage 886 provided outside the path providing device 800. The external storage 886 may refer to SDD/HDD having a large storage capacity.

The external storage 886 may be provided outside the path providing device 800 but is provided in the vehicle to perform wired communication (or CAN communication). In addition, the external storage 886 may be a memory 140 provided in a vehicle. The external storage 886 will be referred to as an external storage in this specification.

The previously described memories 882 and 885 may refer to the storage part of the processor 830 and the calculating part of the processor 830, described with respect to FIG. 8. For example, the system memory 882 may refer to the calculating part of the processor 830, and the internal storage 885 may refer to the storage part of the processor 830.

In summary, the path providing device 800 may include a memory, and the memory may include a first memory 883 (RAM) temporarily storing data while power is supplied and a second memory 885 (internal storage, flash memory) storing data even when power supply is interrupted.

The first memory 883 and the second memory 885 may be connected to the data bus 881 configured to transmit information received through the TCU 810 to the memory.

Here, as illustrated in FIG. 14, each of the first memory 883 and the second memory 885 may be connected to the data bus 881 through an interface 887.

The interface 887 is a path connecting the data bus 881 and components (e.g., the first memory and the second memory) provided in the path providing device 800. The interface 887 may be a wire connecting CAN communication, or a circuit provided on a printed circuit board.

In addition, the path providing device 800 may further include an input device interface 888 that transmits information transmitted through the data bus 881 to an electric component 889 provided in a vehicle. The input device interface 888 may be the interface unit 820 described above.

The second memory 885 is a flash memory, and may have a moderately high processing speed and a proper capacity.

For example, the second memory 885 may be configured such that the processing speed is a first speed and the storage capacity is a first capacity.

Here, as illustrated in FIG. 14, the external storage 886 (SSD/HDD) having a second speed whose processing speed is slower than the first speed and whose storage capacity is greater than the first capacity may be connected to the data bus 881 through the interface 887.

The external storage (SDD/HDD) has a slower processing speed than the second memory 885 (flash memory) included in the path providing device, but may have a large storage capacity.

Accordingly, the present disclosure may store data having a large capacity in an external storage, and may store data not having a large capacity and requiring fast processing in the first or second memory.

The second memory 885 may be divided into a plurality of storage spaces to store different types of data. In each of the plurality of storage spaces, a plurality of layers constituting map information may be separately stored.

Figure 16:
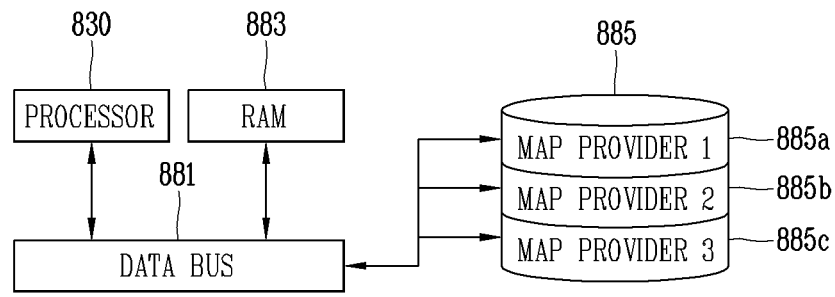
FIG. 16 is a conceptual view of an exemplary memory including a plurality of storage spaces.

For example, as illustrated in FIG. 16, the second memory 885 may be segmented (or divided) into a plurality of storage spaces. This means an idea of dividing the storage space inside the second memory 885 into several storage spaces, and a component or a partition may be introduced into the idea.

Specifically, information included in the first layer among the plurality of layers may be stored in a first storage space (e.g., 885*a*) among the plurality of storage spaces 885*a*, 885*b*, and 885*c*.

Also, information included in the second layer different from the first layer among the plurality of layers may be stored in a second storage space (e.g., 885*b*) different from the first storage space among the plurality of storage spaces.

For example, the first layer (topology information) among the plurality of layers constituting map information may be stored in the first storage space 885*a*, and the second layer (landmark information) among the plurality of layers constituting map information may be stored in the second storage space 885*b*.

In addition, the first memory 883 and the second memory 885 may be configured such that bi-directional data transmission through the data bus 881 is allowed.

That is, the first memory 883 and the second memory 885 may not only store information received from the server 1400 through the TCU 810 under the control of the processor 830, but also may perform bi-directional data transmission in which information stored in the second memory 885 is loaded into the first memory 883 or the processor 830, or information stored in the first memory 883 is loaded into the processor 830. In addition, the processor 830 may not only store data in the first memory 883, but may also move information stored in the first memory 883 to the second memory 885 and store the information in the second memory 885.

Hereinafter, a method for processing information received through the TCU 810 in the path providing device (e.g., map information received from the server 1400, or information received from an external device existing within a predetermined distance from a vehicle) through a memory will be described in more detail with respect to the accompanying drawings.

The processor 830 may temporarily store and later delete the map information received from the server 1400 in the first memory 883 according to the type of map information, or may store the map information in the second memory 885 for a long time. In addition, to prepare for a case in which a communication through the TCU 810 is not available, the processor 830 may store large-scale map information in the external storage 886.

Referring to FIG. 15A, the processor 830 may store map information received through the TCU 810 in a specific area of the first memory 883 (RAM). Here, when receiving the map information from the server 1400, the processor 830 may sequentially receive a plurality of partial map information.

Here, the plurality of partial map information may refer that the map information is divided into a plurality of partial map information. The plurality of partial map information may refer to map information in tile units described above.

Each of the plurality of partial map information may be formed of a plurality of layers, and the plurality of layers may be formed in same size (i.e., to cover same area).

That is, the partial map information may refer to map information having a smaller size than that of the map information, and may refer to map information in tile units covering a predetermined area, as illustrated in FIGS. 12A and 12B.

The processor 830 may sequentially receive the plurality of partial map information from the server 1400 through the TCU 810. Here, the processor 830 may preferentially store the received plurality of partial map information (i.e., map information in tile units) in the first memory 833 in sequence.

Thereafter, the processor 830 may allocate a specific area of the first memory 883 to store map information for caching of the map information (plural partial map information). The caching may refer that the processor 830 temporarily stores map information (partial map information) having a high frequency of use in the first memory 883 having a high processing speed in order to quickly use data.

The processor 830 may use the map information stored in the first memory 883 to perform various operations related to EHP (e.g., a process of generating/updating an optimal path or generating/updating horizon information for autonomous driving), or generate forward path information (optimal path or MPP) and store the information in the first memory 883.

In addition, the processor 830 may transmit information related to the EHP stored in the first memory 883 (e.g., optimal path or horizon information for autonomous driving) to an electronic component or application provided in the vehicle through an external interface, and delete information related to the EHP from the first memory 883. Here, the deletion may be sequentially performed according to a caching policy.

In some implementations, the path providing device 800 may receive map information from a plurality of servers of map suppliers (or map information companies/entities) through the TCU 810. Here, a plurality of map information is received, and the plurality of map information may be map information generated by different map information companies.

Since the map information companies are different, a type, form, style, precision, and enhanced part (e.g., whether highway map information is detailed or city map information is detailed) of information included in the plurality of map information may be different.

The processor 830 may receive map information from a plurality of servers of map suppliers (or map information companies/entities) through the TCU 810. Here, processor 830 may selectively receive the map information.

As illustrated in FIG. 15B, the processor 830 may preferentially (primarily) store the received map information in the first memory 883 (RAM).

The processor 830 may classify the map information stored in the first memory 883 into volatile data and data for storage according to an attribute of the map information stored in the first memory 883, and may determine whether to temporarily store the map information in the first memory 883 or to move the map information to the second memory 885 and store therein, according to a result of the classification.

For example, the attribute of the map information may include whether it is a high-definition map, whether it is dynamic information needed in updating, and the like, and may vary according to the type of the layer included in the map information among the plurality of layers.

Thereafter, the processor 830 may divide the map information stored in the first memory 883 into volatile data and data for storage according to the attribute of the map information stored in the first memory 883, and may temporarily store then delete the received map information in the first memory 883 or may store the map information in the second memory 885 according to a result of the division.

In addition, when a capacity of the received map information has a capacity equal to or greater than a predetermined size, the processor 830 may store the received map information in the external storage 886 other than the second memory 885.

FIG. 16 is a conceptual view of an exemplary memory including a plurality of storage spaces.

As illustrated in FIG. 16, the memory (second memory 885) may be divided into a plurality of storage spaces 885a, 885b, and 885c.

Upon receiving a plurality of map information generated by different map information companies (or servers of map information companies, or servers of map suppliers) through the TCU 810, the processor may store the plurality of map information separately in the plurality of storage spaces 885a, 885b, and 885c.

Specifically, the processor 830 may store first map information received from a first map information company in the first storage space 885a among the plurality of storage spaces.

Further, the processor 830 may store second map information received from a second map information company different from the first map information company in the second storage space 885b different from the first storage space among the plurality of storage spaces.

As described above, the path providing device 800 may receive map information from a server. Here, the server may refer to a map information company (or a server used by a map information company, a map supplier, or a server of a map supplier) that produces (or supplies) map information.

In addition, in terms of transmitting map information, the server may refer to a server of a mobile communication company (or a mobile communication entity) providing a mobile communication network service.

Here, the map information company (or map provider, map supplier) may transmit map information to the server of the mobile communication company forming a mobile communication network, and the map information may be transmitted to the path providing device 800 through the TCU 810 through the server of the mobile communication company.

When a plurality of map information companies exists and one mobile communication network exists, the plurality of map providers may transmit map information to a server (a server of a mobile communication company) forming the one mobile communication network.

The server forming the mobile communication network may transmit a plurality of map information received from the plurality of map information companies to the TCU 810.

In some implementations, a map information company may provide map information directly to the TCU 810 by using a predetermined mobile communication network.

The processor 830 may receive different types of map information from different map information companies. For example, the processor 830 may receive first map information including highway information in detail from the first map information company, and may receive second map information including city information in detail from the second map information company.

Here, receiving different types of map information may include selectively receiving a plurality of layers forming the map information.

For example, the processor 830 may receive a first layer including highway information from the first map information company and receive a second layer including landmark information from the second map information company.

The processor 830 may divide (segment) the storage space of the second memory 885 into a plurality of storage spaces.

The processor 830 may determine a storage space for storing the plurality of map information based on the capacity of the received plurality of map information.

For example, the first map information having the largest capacity (first capacity) among the plurality of map information may be stored in the first storage space with the largest storage capacity among the plurality of storage spaces.

In addition, the second map information having the second largest capacity (second capacity smaller than the first capacity) among the plurality of map information may be stored in the second storage space with the second largest storage capacity among the plurality of storage spaces.

In some implementations, as illustrated in FIG. 16, the processor 830 may allocate storage space for each map information company.

For example, the processor 830 may store at least one piece of information (or a plurality of pieces of information) received from the first map information company all in the first storage space of the memory 885 and may store at least one piece of information (or a plurality of pieces of information) received from the second map information company all in the second storage space of the memory 885.

That is, the processor 830 may determine a storage space stored in the memory according to the type or capacity of the map information, or may determine a storage space for each map information company that provides (transmits) the map information.

The plurality of storage spaces formed in the memory 885 may all have same capacity. In some implementations, one or more storage spaces may have different size of capacity.

In addition, the capacity of the plurality of storage spaces may be varied under the control of the processor 830.

As described above, the memory included in the path providing device 800 may include the first memory 883 (RAM) that temporarily stores data while power is being supplied, and the second memory 885 (flash memory) that stores data even when power is interrupted.

Hereinafter, a method for storing and deleting map information received through the TCU 810 in the first and second memories will be described in more detail with respect to the accompanying drawings.

Figure 17:
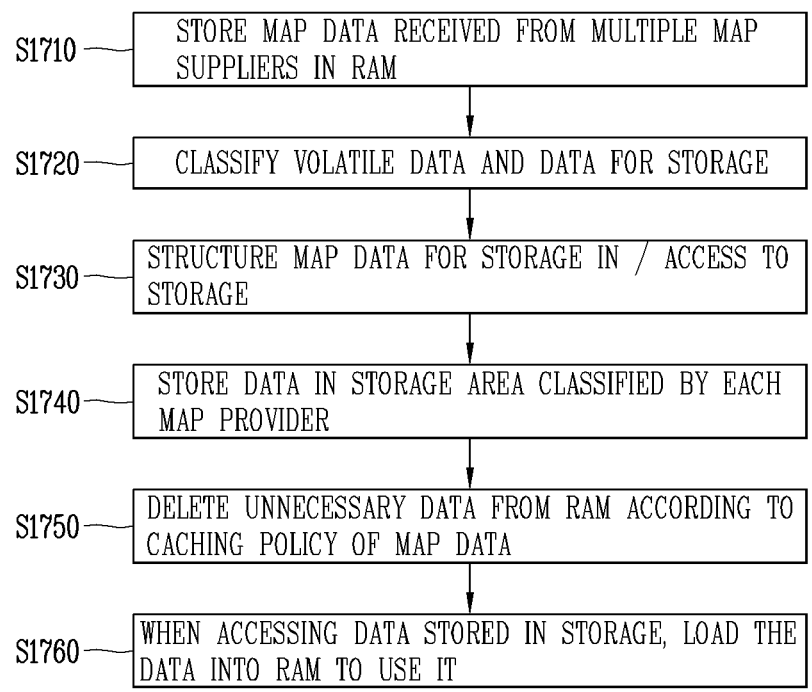
FIGS. 17, 18, and 19 are flowcharts of an exemplary method for controlling a memory.
Figure 18:
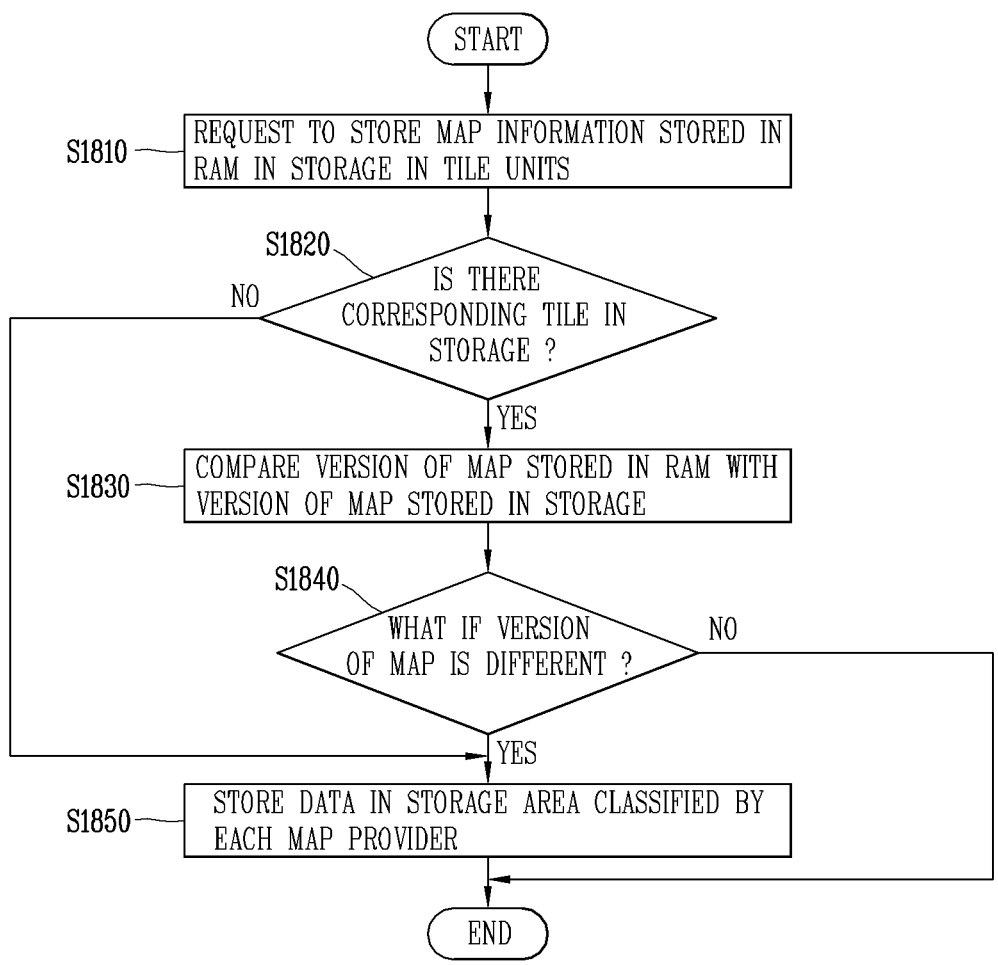
Figure 19:
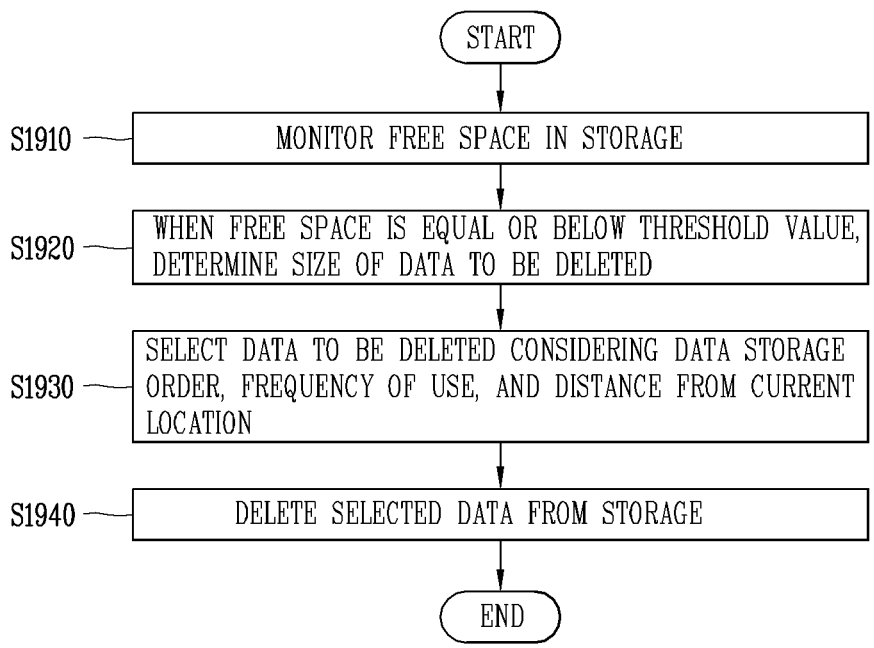

FIGS. 17, 18, and 19 are flow charts of an exemplary method for controlling a memory.

First, referring to FIG. 17, the processor 830 may store map data (a plurality of map information) transmitted from a plurality of map information companies (map suppliers) in RAM [S1710].

For example, the processor 830 may preferentially store information (map information) received through the TCU 810 in the first memory 883 (RAM).

Thereafter, the processor 830 may classify the information into volatile data and data for storage according to a type of the information stored in the first memory 883 [S1720].

For example, the processor 830 may delete the information from the first memory 885, or move the information to store in the second memory 885 (flash memory) based on the type of information stored in the first memory 883.

In addition, the processor 830 may structure the data (map information) received and preferentially stored in the first memory 883 for storage in and access to the second memory 885 [S1730]. The structuring may refer to, for example, dividing information into a plurality of layers, as illustrated in FIGS. 11A and 11B, or generating horizon information for autonomous driving as illustrated in FIG. 10.

In some implementations, as described above, the processor 830 may divide (segment) the second memory 885 into a plurality of storage spaces. Here, dividing (segmenting) the memory into a plurality of storage spaces may refer to performing partitioning.

The processor 830 may allocate a plurality of storage spaces for each map information company.

The processor 830 may store information (map information) received from a map information company that has transmitted the information (map information) through the TCU 810 in the allocated storage space. That is, the processor 830 may store information (map information) in a storage space classified for each map information company [S1740].

As another example, the processor 830 may store received map information in different storage spaces based on a capacity or a type of the received map information.

Thereafter, the processor 830 may delete unnecessary information from the first memory 883 according to a caching policy of map information [S1750].

For example, the processor 830 may delete data that has been moved (or copied) from the first memory 883 to the second memory 885 to be stored therein, and data determined that has been used for generating/updating optimal path or horizon information for autonomous driving in the first memory 883, from the first memory 883.

Also, when loading (or accessing to) data (map information) stored in the second memory 885, the processor 830 may load the data in the first memory 883 (RAM) to use it [S1760].

For example, a plurality of map information may be stored in the second memory 885. In this state, the processor 830 may divide a road to a destination into multiple path sections based on characteristics of the road and determine a type of map information to be used for each divided path section based on the characteristics of the road.

Thereafter, the processor 830 may load map information to be used in each path section from the second memory 885 to the first memory 883 to generate optimal paths (MPP) for each path section.

The related descriptions will be described later in detail with respect to FIGS. 25 and 26.

In some implementations, the path providing device 800 may receive various types of map information through the TCU 810, and may store the received map information in various ways in a memory.

For example, referring to FIG. 18, the processor 830 may receive map information from the server 1400 through the TCU 810. By way of further example, the map information may be map information or partial map information received in tile units, as described above.

The processor 830 may request to store map information stored in the first memory (RAM) 883 in the second memory 885 in tile units (or partial map information units) [S1810].

Here, the processor 830 may determine whether there is map information (or map information in tile units, partial map information) requested to be stored in the second memory 885 [S1820].

When there is the map information requested to be stored in the second memory 885, the processor 830 may compare a version of the map information requested to be stored in the first memory 883 (e.g., RAM) with a version of the map information pre-stored in the second memory 885 [S1830].

Here, when the versions of the map information are different [S1840], the processor 830 may store the requested map information in the second memory 885 [S1850].

In addition or alternatively, in the step S1820, when there is no map information requested to be stored in the second memory 885, the map information requested to be stored may be stored in the second memory 885.

In some implementations, when the map version is same, the map information requested to be stored may be already stored in the second memory 885, thus the processor 830 may delete the map information stored the first memory 883.

Referring to FIG. 19, the processor 830 may monitor a space for storage (i.e., free space) in the second memory 885 [S1910].

Here, when the free space is equal or below a threshold value, the processor 830 may determine a capacity (or size) of data to be deleted [S1920].

Specifically, the processor 830 may select (determine) data (map information) to be deleted by considering at least one of a storage order of data, a frequency of use, or a distance between a location of a current vehicle and a location of an area included in the data (map information) [S1930].

For example, when a current vehicle is located at a first location and there is map information (data) corresponding to an area of a second location spaced apart by a predetermined distance or more from the first location, the processor 830 may select the map information corresponding to the area of the second location as data to be deleted.

Thereafter, the processor 830 may delete the selected data (map information) from the second memory 885 to secure (expand) a free space in the second memory 885 [S1940].

In some implementations, the processor 830 may store data in different ways according to the capacity of the second memory 885.

Figure 20:
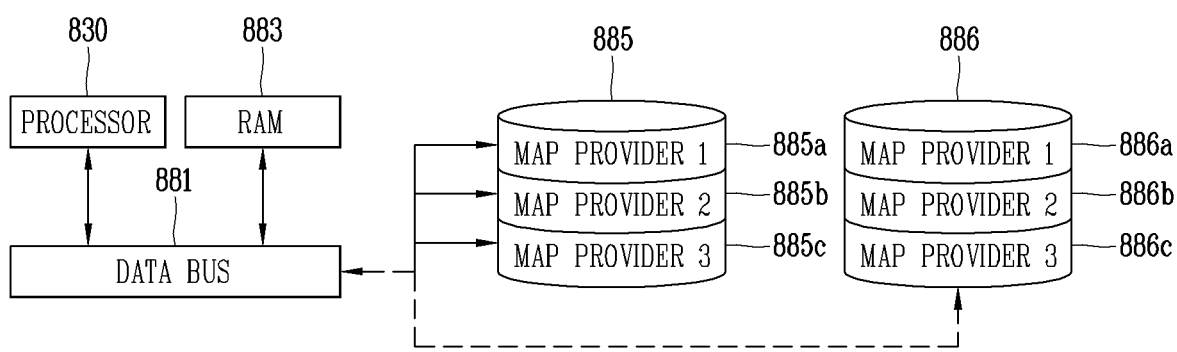
FIGS. 20 and 21 are conceptual views illustrating an exemplary method of storing map information in a memory.
Figure 21:
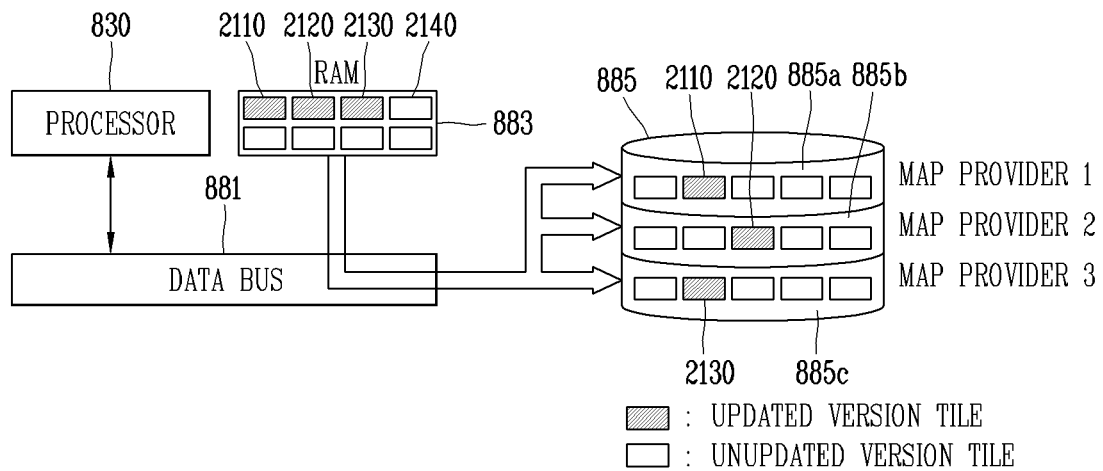

FIGS. 20 and 21 are conceptual views of an exemplary method of storing map information in a memory.

For example, when the capacity of the second memory 885 is greater than or equal to a predetermined amount (i.e., sufficient), the processor 830 may divide (segment) the second memory 885 into a plurality of storage spaces and store map information in the divided plurality of storage spaces without having to use a separate external storage 886.

At this time, as described above, the processor 830 may store map information in different storage spaces according to each company that produces map information.

In some implementations, when the capacity of the second memory 885 is less than a predetermined amount (i.e., not sufficient), the processor 830 may process map information in a following manner.

According to some implementations, the processor 830 may store map information within a predetermined radius based on a location of a current vehicle in the second memory 885 and may immediately delete unnecessary data by determining a validity of the stored map information based on the current vehicle location.

According to some implementations, the processor 830 may store only a basic layer needed in generating an optimal path among a plurality of layers included in map information in the second memory 885.

Here, the basic layer may be a layer including road information and lane information needed in generating an optimal path.

Thereafter, rest of the layers except the basic layer may be received in real time from the server through the TCU 810, and stored in the first memory 883 (RAM) to update the optimal path or to generate/update horizon information for autonomous driving.

Further, the second memory may be divided into a plurality of storage spaces, and the plurality of layers of the map information may be separately stored in each of the plurality of storage spaces.

At this time, the processor may determine a type of memory in which each layer is stored and a storage space in the second memory, based on at least one of a type or a capacity of each of the plurality of layers.

For example, the processor 830, based on at least one of the type of each of the plurality of layers (e.g., whether or not the basic layer) or a size of the capacity, may determine a type of memory (first memory, second memory or external storage) in which each layer is to be stored and a storage space in the second memory.

According to some implementations, the processor 830 may store map information including the current location and map information within a predetermined distance from the current location in the second memory 885, and store map information outside the predetermined distance in the external storage 886, as illustrated in FIG. 20.

In addition, when information received through the communication unit is map information of a predetermined capacity or more, the processor 830 may store the map information of a predetermined capacity or more in an external storage provided in the vehicle and/or provided outside the path providing device.

At this time, the external storage 886 may be segmented (or divided) into a plurality of storage spaces 886a, 886b, and 886c, as illustrated in FIG. 20. The external storage 886 may store map information according to a capacity of the map information in different storage spaces, such as the second memory 885, or may store map information to a same storage space for each map provider that produced the map information.

In some implementations, map information may be already stored in the second memory 885 or the external storage 886 from the time the product is first released. This is for the processor 830 to generate an optimal path or to generate horizon information for autonomous driving even when map information is not separately received from the TCU 810.

In this case, the processor 830 may load map information pre-stored in the second memory 885 into the first memory 883 to generate an optimal path or horizon information for autonomous driving.

In some implementations, when the processor 830 receives a latest version of map information (or map information in tile units) from the server through the TCU 810, the processor 830 may preferentially store the received map information in the first memory 883.

Thereafter, as illustrated in FIG. 21, processor 830 may determine whether the received map information exists in the second memory 885.

When the information does not exist, the processor 830 may move and store the received map information from the first memory 883 to the second memory 885.

When the received map information is already present in the second memory 885, the processor 830 may compare a version of the received map information 2110, 2120, 2130, and 2140 with a version of the pre-stored map information.

Thereafter, when the versions are different (e.g., when the version of the received map information is higher), the processor 830 may move the map information 2110, 2120, 2130 stored in the first memory 883 to the second memory 885 and store therein.

When the version of the received map information 2140 and the version of the map information pre-stored in the second memory 885 are same, the processor 830 may delete the received map information from the first memory 883.

In some implementations, when there is the external storage 886, the processor 830 may store map information stored in the second memory 885 in the external storage 886 as well. Thereafter, even if the map information is deleted from the second memory 885, the processor 830 may generate an optimal path or horizon information for autonomous driving by using same map information as the map information deleted from the external storage 886.

Figure 22:
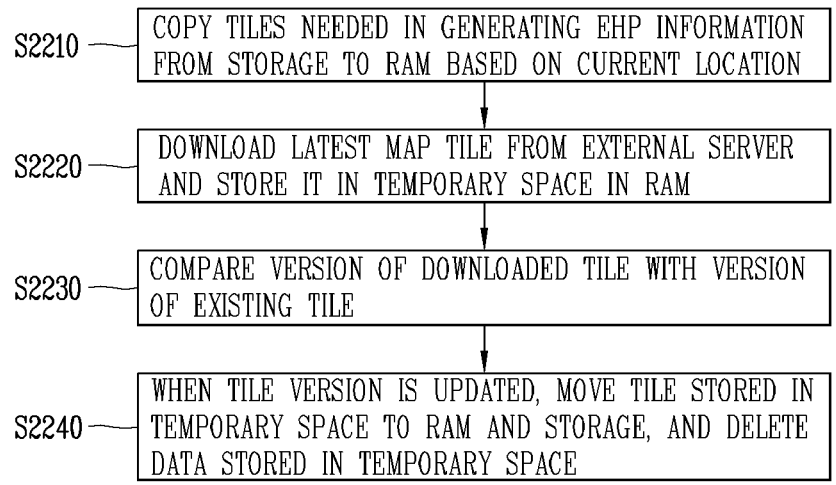
FIGS. 22, 23, and 24 are flowcharts of an exemplary method for controlling a memory.
Figure 23:
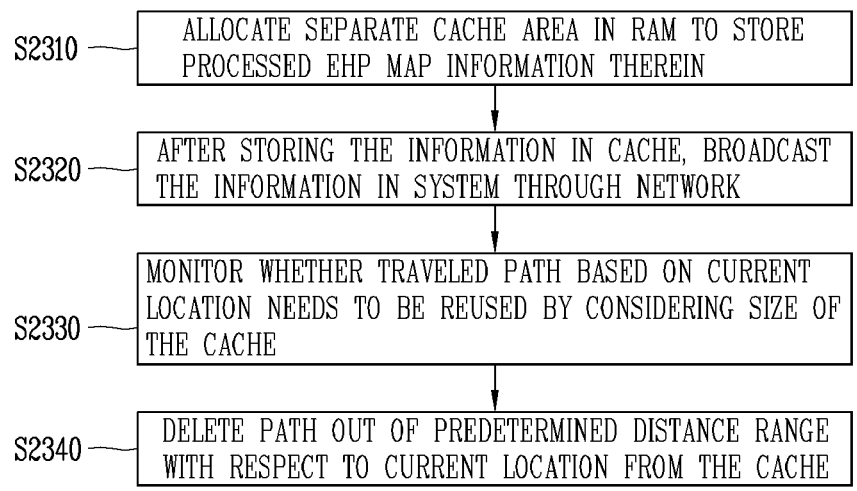
Figure 24:
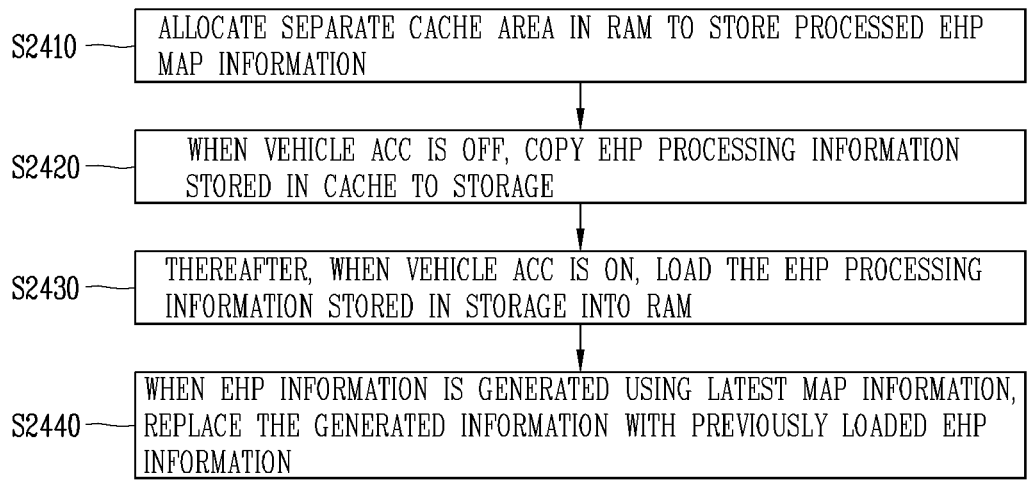

FIGS. 22, 23, and 24 are flowcharts of an exemplary method for controlling a memory.

Referring to FIG. 22, the processor 830 may copy map information (or partial map information, and map information in tile units) needed in generating an optimal path or horizon information for autonomous driving (EHP information) based on the current location from the second memory 885 to the first memory 883 [S2210].

Also, the processor 830 may receive a latest version of map tile (i.e., latest version of map information or partial map information) from an external server and store it in the first memory 883 [S2220].

The processor 830 may compare a version of the map information received from the external server with a version of the map information copied to the first memory [S2230].

Thereafter, when the version of the map information received from the external server is higher (newer), the processor 830 may update the map information copied to the first memory 883 and the map information stored in the second memory 885 by using the received map information. Also, the processor 830 may delete the map information (data) stored in the first memory 883 [S2240].

In some implementations, the processor 830 may generate horizon information for autonomous driving by using the received map information.

At this time, referring to FIG. 23, the processor 830 may allocate separate cache area in the first memory 883 and store the generated horizon information for autonomous driving (i.e., processed EHP map information) in the allocated separate cache area [S2310].

Also, the processor 830 may broadcast the horizon information for autonomous driving stored in the cache area to a system (i.e., an electronic component provided in a vehicle) through the TCU 810 [S2320].

At this time, the processor 830 may monitor whether a traveled path (also, horizon information for autonomous driving) based on current location needs to be reused by considering a size of the cache (i.e., cache area of the first memory 883) [S2330].

Thereafter, the processor 830 may delete a path (also, horizon information for autonomous driving) out of a predetermined distance range with respect to the current location from the cache area of the first memory 883 [S2340].

With this configuration, the present disclosure may secure a storage capacity in the first memory by storing horizon information for autonomous driving in the first memory 883 to perform fast processing, broadcasting the stored horizon information for autonomous driving to an electronic component provided in a vehicle, and deleting the information from the first memory.

In some implementations, referring to FIG. 24, the processor 830 may allocate the processed EHP map information (i.e., horizon information for autonomous driving) in a separate cache area in the first memory 883 and store the information therein [S2410].

Subsequently, when an adaptive cruise control (ACC) function of the vehicle is turned off (OFF), the processor 830 may store the horizon information for autonomous driving stored in the first memory 883 in the second memory 885 [S2420]. This is because the horizon information for autonomous driving should be used at a high processing speed while the adaptive cruise control (ACC) function is executed, so the information is stored in the first memory 883.

In some implementations, the horizon information for autonomous driving is used at a slow processing speed or does not need to be used when the ACC function is turned off.

Thereafter, when the ACC function of the vehicle is executed again (ON), the processor 830 may load the horizon information for autonomous driving stored in the second memory 885 back into the first memory 883 [S2430].

When EHP information (horizon information for autonomous driving) is generated using the latest map information received through the TCU 810, the processor 830 may replace the generated information with the EHP information previously loaded to the first memory 883 [S2440].

Here, the replacement may refer that the horizon information for autonomous driving loaded in the first memory 883 is deleted and the newly generated horizon information for autonomous driving is stored (or loaded) in the first memory 883.

Hereinafter, a method for generating an optimal path by using map information stored in the memory will be described in more detail with respect to the accompanying drawings.

Figure 25:
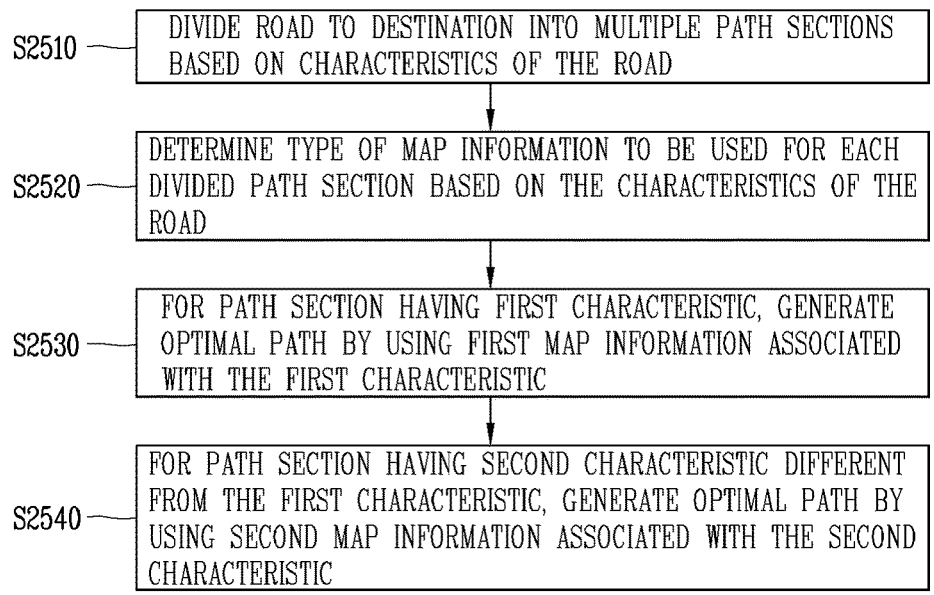
FIGS. 25 and 26 are views illustrating an exemplary method for generating an optimal path by using map information stored in a memory.
Figure 26:
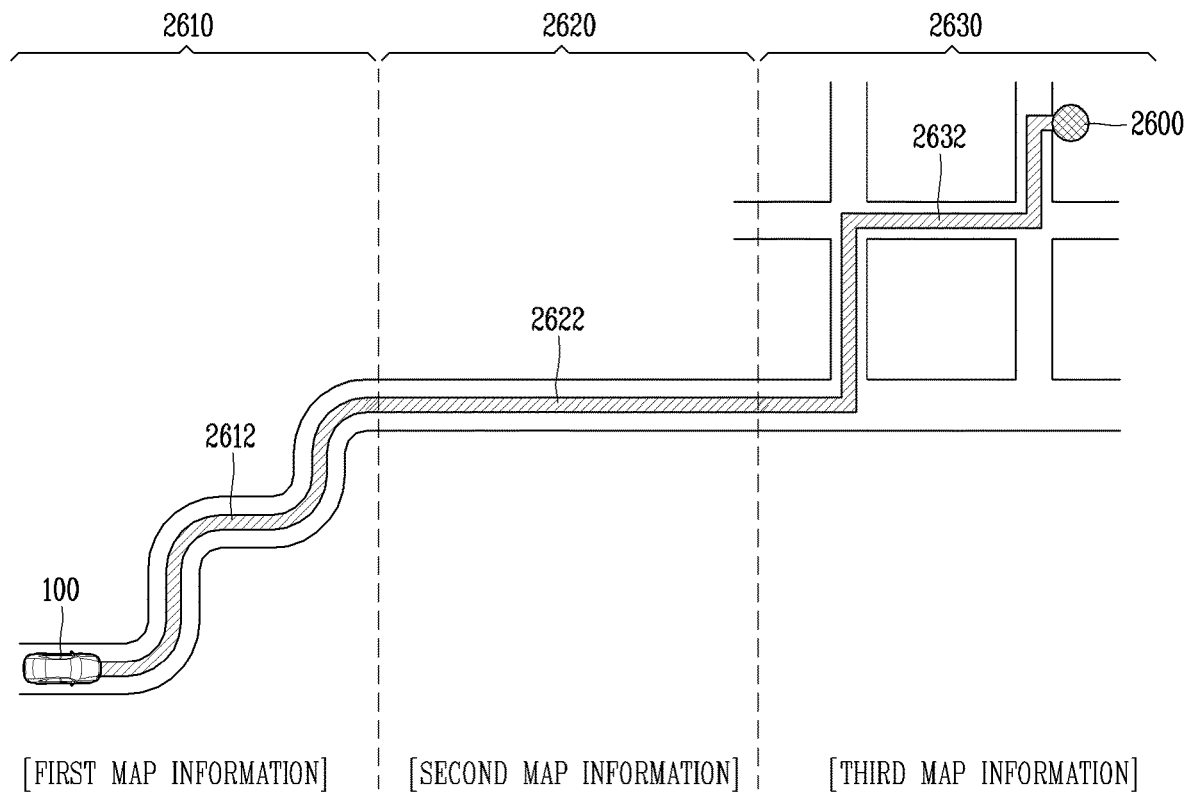

FIGS. 25 and 26 are views illustrating an exemplary method for generating an optimal path by using map information stored in a memory.

Referring to FIG. 25, the processor 830 may divide a road to a destination into multiple path sections based on characteristics of the road [S2510].

Also, the processor 830 may determine a type of map information to be used for each divided path section based on the characteristics of the road [S2520].

Specifically, for a path section having a first characteristic, the processor 830 may generate an optimal path by using first map information associated with the first characteristic [S2530].

In addition, for a path section having a second characteristic which is different from the first characteristic, the processor 830 may generate an optimal path by using second map information associated with the second characteristic [S2540].

Here, the first map information and the second map information may be map information received from different subjects (i.e., map information provider, map information company, and map supplier which are different from each other).

The first map information and the second map information may be partial map information whose size is equal to or smaller than a predetermined size and configured to include the divided path sections.

Here, a plurality of map information may be stored in the second memory 885. In this state, the processor 830 may divide a road to a destination into multiple path sections based on characteristics of the road and determine a type of map information to be used for each divided path section based on the characteristics of the road.

Thereafter, the processor 830 may load map information to be used in each path section from the second memory 885 to the first memory 883 to generate optimal paths (MPP) for each path section.

That is, the first and second map information may refer to partial map information or map information in tile units described above.

As illustrated in FIG. 26, the processor 830 may determine a road on which a vehicle should travel, based on a current location of the vehicle 100 and a location of a destination 2600. Thereafter, the processor 830 may divide the road to the destination into a plurality of path sections 2610, 2620, and 2630 based on the characteristics of the road.

For example, the first path section 2610 may be a national road with a lot of curves, the second path section 2620 may be a highway, and the third path section 2630 may be a downtown road.

The processor 830, for a path section having a first characteristic (e.g., a national road) 2610, may generate an optimal path 2612 by using first map information associated with the first characteristic.

In addition, for a path section having a second characteristic (e.g., a highway) 2620, the processor 830 may generate an optimal path 2622 by using second map information associated with the second characteristic.

The processor 830, for a path section having a third characteristic 2630, may also generate an optimal path 2632 by using third map information associated with the third characteristic.

That is, optimized (or detailed, compatible) map information may vary according to characteristics of path sections for each map information company.

For example, the first map information made by the first map information company may have more detailed map information with the first characteristic (i.e., national road) than map information made by other map information companies.

In addition, the second map information made by the second map information company may have more detailed map information of the second characteristic (i.e., highway) than map information made by other map information companies.

As described above, information on characteristics of roads may be associated with each map information.

The processor 830 may determine map information to be used in each path section based on a characteristic of a road associated with each map information and a characteristic of a road for a plurality of path sections.

Thereafter, the processor 830 may generate optimal paths for each of the determined path sections in lane units by using the determined map information.

In addition, the processor 830 may determine a path section including current vehicle location among the divided path sections. The processor 830 may determine map information in the memory based on the characteristics of the road in the determined path section. The processor 830 may estimate an optimal path in lane units in the determined path section by using the determined map information.

For example, when it is determined that the location of the vehicle is included in the first path section 2610, the processor 830 may determine first map information to be used to calculate an optimal path in the path section in the memory, based on the characteristic of the road in the first path section 2610. The first map information may be map information associated with the characteristic of the road (national road) in the first path section.

Thereafter, the processor 830 may estimate an optimal path 2612 in lane units in the first path section 2610, using the determined first map information.

In a case that the vehicle 100 is located in the second path section or in the third path section, the above-described method may also be applied in the same or similar manner.

In addition, when the vehicle passes through a path section in which map information loaded in the first memory 883 is used, the processor 830 may delete the loaded map information from the first memory 883.

As described above, in a state where the map information used in generating an optimal path is loaded from the second memory 885 to the first memory 883, the processor 830 may generate an optimal path by using the map information loaded in the first memory 883. This is to create/update the optimal path quickly while the vehicle is driving.

In some implementations, when it is determined that the vehicle has passed through a path section in which map information loaded in the first memory 883 is used, the processor 830 may delete the loaded map information from the first memory 883.

Hereinafter, effects of a path providing device and a path providing method thereof will be described.

First, the present disclosure may provide a path providing device including a memory optimized for generating or updating horizon information for autonomous driving.

Second, the present disclosure may effectively store and delete information needed in performing autonomous driving or lane-based path guidance by using an optimized memory.

Third, the present disclosure may provide a path providing device capable of efficiently processing received information by using a plurality of memories and improving memory efficiency by storing or deleting according to a type of information.

Fourth, the present disclosure may provide a path providing device capable of dividing a memory into a plurality of storage spaces, separately storing different types of map information generated by different map information companies in a plurality of storage spaces, and generating horizon information for autonomous driving or an optimal path by loading map information optimized for a situation from the memory.

The present disclosure can be implemented as computer-readable codes (applications or software) in a program-recorded medium. The method of controlling the autonomous vehicle can be realized by a code stored in a memory or the like.

The computer-readable media may include all types of recording devices each storing data readable by a computer system. Examples of such computer-readable medium may include hard disk drive (HDD), solid state disk (SSD), silicon disk drive (SDD), ROM, RAM, CD-ROM, magnetic tape, floppy disk, optical data storage element and the like. Also, the computer-readable media may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A path providing device configured to provide a path information to a vehicle, the device comprising:
   a communicator including at least one of a transmitting antenna, a receiving antenna, a radio frequency (RF) circuit, or a RF device and configured to receive, from a server, map information including a plurality of layers of data;
   an interfacer, implemented using one or more computing devices, configured to receive sensing information from one or more sensors disposed at the vehicle, the sensing information including an image received from an image sensor;
   a processor configured to:
      identify a lane in which the vehicle is located among a plurality of lanes of a road based on the sensing information,
      determine an optimal path for guiding the vehicle from the identified lane, the optimal path comprising one or more lanes included in the map information,
      generate, based on the sensing information and the optimal path, autonomous driving visibility information and transmit the autonomous driving visibility information to at least one of the server or an electric component disposed at the vehicle, and
      update the optimal path based on dynamic information related to a movable object located in the optimal path and the autonomous driving visibility information; and
   a memory configured to store information used to determine and update the optimal path, and divided into a plurality of storage spaces,
   wherein the processor is configured to store, based on a plurality of map information generated by different map information suppliers being received, the plurality of map information separately in the plurality of storage spaces,
   wherein the memory comprises:
      a first memory configured to temporarily store data, and
      a second memory configured to store data, and
   wherein the processor is further configured to:
      receive the map information from the server,
      store the map information in the first memory,
      classify the map information stored in the first memory into volatile data and storage data according to an attribute of the map information, and
      control to store the map information in the first memory temporarily or move the map information to the second memory based on a result of the classification.

2. The path providing device of claim 1, wherein the processor is further configured to:
   store first map information received from a first map information supplier in a first storage space among the plurality of storage spaces, and store second map information received from a second map information supplier in a second storage space among the plurality of storage spaces.

3. The path providing device of claim 2, wherein the processor is further configured to:
determine a storage space to store the plurality of map information, based on a capacity of the plurality of map information.

4. The path providing device of claim 1, wherein the processor is further configured to:
divide a road to a destination into multiple path sections based on characteristics of the road, and
determine a type of map information to be used for each of the path sections based on the characteristics of the road.

5. The path providing device of claim 4, wherein the processor is further configured to:
generate a first optimal path of a first path section having a first characteristic among the path sections by using first map information associated with the first characteristic, and
generate a second optimal path of a second path section having a second characteristic among the path sections by using second map information associated with the second characteristic,
wherein the second characteristic is different from the first characteristic.

6. The path providing device of claim 5, wherein the first map information and the second map information are different map information received from different map information suppliers.

7. The path providing device of claim 5, wherein the first map information and the second map information are partial map information each having a size that is equal to or smaller than a predetermined size and configured to include the path sections.

8. The path providing device of claim 4, wherein the processor is further configured to:
determine a path section including a current vehicle location among the path sections,
determine map information in the memory based on characteristics of the road on the determined path section, and
determine an optimal path in the determined path section for guiding the vehicle by using the map information determined based on the characteristics of the road on the determined path section.

9. The path providing device of claim 1,
wherein the plurality of map information is stored in the second memory, and
wherein the processor is further configured to:
divide a road to a destination into multiple path sections based on characteristics of the road,
determine map information to be used for each of the path sections based on the characteristics of the road, and
load the map information, which is determined to be used for each of the path sections, from the second memory to the first memory to generate optimal paths for each of the path sections.

10. The path providing device of claim 1, wherein the processor is further configured to:
delete, based on a vehicle passes through a path section in which map information loaded into the first memory being used, the loaded map information.

11. The path providing device of claim 1, wherein the processor is further configured to:
based on information received through the communicator being map information having a predetermined capacity or more, store the map information in an external storage provided in at least one of the vehicle or outside the path providing device.

12. The path providing device of claim 1, wherein the second memory is configured to be divided into a plurality of storage spaces, and
wherein a plurality of layers of the map information is separately stored in each of the plurality of storage spaces.

13. The path providing device of claim 12, wherein the processor is further configured to:
determine (i) a type of memory in which each of the plurality of layers is stored and (ii) a storage space in the second memory, based on a type or a capacity of each of the plurality of layers of the map information.

14. A path information providing method comprising:
receiving, from a server, map information including a plurality of layers of data;
receiving sensing information from one or more sensors disposed at a vehicle, the sensing information including an image received from an image sensor;
identifying a lane in which the vehicle is located among a plurality of lanes of a road based on the sensing information;
determining an optimal path for guiding the vehicle from the identified lane, the optimal path comprising one or more lanes included in the map information;
generating, based on the sensing information and the optimal path, autonomous driving visibility information and transmitting the autonomous driving visibility information to at least one of the server or an electric component disposed at the vehicle;
updating the optimal path based on dynamic information related to a movable object located in the optimal path and the autonomous driving visibility information;
storing, in a memory, information used to determine and update the optimal path, the memory divided into a plurality of storage spaces; and
storing, based on a plurality of map information generated by different map information suppliers being received, the plurality of map information separately in the plurality of storage spaces,
wherein the memory comprises:
a first memory configured to temporarily store data, and
a second memory configured to store data,
wherein the path information providing method further comprises:
receiving the map information from the server,
storing the map information in the first memory,
classifying the map information stored in the first memory into volatile data and storage data according to an attribute of the map information, and
controlling to store the map information in the first memory temporarily or move the map information to the second memory based on a result of the classification.

15. The path information providing method of claim 14, further comprising:
storing first map information received from a first map information supplier in a first storage space among the plurality of storage spaces; and
storing second map information received from a second map information supplier in a second storage space among the plurality of storage spaces.

16. The path information providing method of claim 15, further comprising:
- determining a storage space to store the plurality of map information, based on a capacity of the plurality of map information.

17. The path information providing method of claim 14, further comprising:
- dividing a road to a destination into multiple path sections based on characteristics of the road; and
- determining a type of map information to be used for each of the divided path sections based on the characteristics of the road.

18. The path information providing method of claim 17, further comprising:
- generating a first optimal path of a first path section having a first characteristic among the path sections by using first map information associated with the first characteristic; and
- generating a second optimal path of a second path section having a second characteristic among the path sections by using second map information associated with the second characteristic,
- wherein the second characteristic is different from the first characteristic.

* * * * *